United States Patent
Choi et al.

(10) Patent No.: US 9,916,667 B2
(45) Date of Patent: Mar. 13, 2018

(54) STEREO MATCHING APPARATUS AND METHOD THROUGH LEARNING OF UNARY CONFIDENCE AND PAIRWISE CONFIDENCE

(71) Applicant: Samsung Electronics Co., Ltd., Suwon-Si, Gyeonggi-Do (KR)

(72) Inventors: Ouk Choi, Yongin-si (KR); Hyun Sung Chang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 207 days.

(21) Appl. No.: 14/580,895

(22) Filed: Dec. 23, 2014

(65) Prior Publication Data

US 2016/0019437 A1    Jan. 21, 2016

(30) Foreign Application Priority Data

Jul. 18, 2014    (KR) .......................... 10-2014-0091042

(51) Int. Cl.
  *G06K 9/68* (2006.01)
  *G06T 7/593* (2017.01)
  *H04N 13/00* (2018.01)

(52) U.S. Cl.
  CPC ...... *G06T 7/593* (2017.01); *H04N 2013/0081* (2013.01)

(58) Field of Classification Search
  None
  See application file for complete search history.

(56) References Cited

U.S. PATENT DOCUMENTS

| | | | | |
|---|---|---|---|---|
| 5,748,199 | A | * | 5/1998 | Palm ................. H04N 13/0014 345/419 |
| 6,078,701 | A | * | 6/2000 | Hsu ......................... G06K 9/32 375/E7.086 |
| 6,744,923 | B1 | | 6/2004 | Zabih et al. |
| 7,330,593 | B2 | | 2/2008 | Hong et al. |
| 8,275,195 | B2 | | 9/2012 | Francini et al. |

(Continued)

FOREIGN PATENT DOCUMENTS

| | | |
|---|---|---|
| KR | 2010-0119559 A | 11/2010 |
| KR | 10-1187600 B1 | 10/2012 |

(Continued)

OTHER PUBLICATIONS

Jian Sun et al, Symmetric stereo matching for occlusion handling, • Proceeding CVPR '05 Proceedings of the 2005 IEEE Computer Society Conference on Computer Vision and Pattern Recognition (CVPR'05)—vol. 2—vol. 02 pp. 399-406.*

(Continued)

*Primary Examiner* — Iman K Kholdebarin
(74) *Attorney, Agent, or Firm* — Harness, Dickey & Pierce, P.L.C.

(57) ABSTRACT

A stereo matching apparatus and method through learning a unary confidence and a pairwise confidence are provided. The stereo matching method may include learning a pairwise confidence representing a relationship between a current pixel and a neighboring pixel, determining a cost function of stereo matching based on the pairwise confidence, and performing stereo matching between a left image and a right image at a minimum cost using the cost function.

17 Claims, 20 Drawing Sheets

(56) References Cited

U.S. PATENT DOCUMENTS

| | | | |
|---|---|---|---|
| 8,326,036 B2 | 12/2012 | Heitz et al. | |
| 8,385,630 B2* | 2/2013 | Sizintsev | G06T 7/97 348/42 |
| 8,458,074 B2 | 6/2013 | Showalter | |
| 8,488,870 B2* | 7/2013 | Martinez-Bauza | H04N 13/0271 345/427 |
| 8,571,303 B2 | 10/2013 | Koizumi et al. | |
| 8,645,440 B2 | 2/2014 | Rosman et al. | |
| 8,659,644 B2 | 2/2014 | Song | |
| 8,718,328 B1* | 5/2014 | Gaddy | G06K 9/00624 375/240.16 |
| 9,225,965 B2* | 12/2015 | Bollano | G06T 15/20 |
| 2005/0129325 A1* | 6/2005 | Wu | H04N 7/144 382/254 |
| 2010/0053307 A1* | 3/2010 | Fang | H04N 13/0221 348/46 |
| 2010/0245684 A1* | 9/2010 | Xiao | H04N 9/3147 348/745 |
| 2010/0303340 A1* | 12/2010 | Abraham | G06T 7/593 382/154 |
| 2011/0090311 A1* | 4/2011 | Fang | H04N 7/15 348/43 |
| 2011/0176722 A1* | 7/2011 | Sizintsev | G06T 7/97 382/154 |
| 2011/0285701 A1* | 11/2011 | Chen | G06K 9/4638 345/419 |
| 2011/0301447 A1* | 12/2011 | Park | G06T 7/0016 600/407 |
| 2012/0014590 A1* | 1/2012 | Martinez-Bauza | H04N 13/0271 382/154 |
| 2012/0206573 A1* | 8/2012 | Dokor | H04N 13/0022 348/46 |
| 2014/0009462 A1* | 1/2014 | McNamer | G06T 19/20 345/419 |
| 2014/0063247 A1* | 3/2014 | Bernal | G06K 9/00785 348/148 |
| 2014/0098191 A1 | 4/2014 | Rime et al. | |
| 2015/0269737 A1* | 9/2015 | Lam | H04N 13/0011 382/154 |
| 2016/0019437 A1* | 1/2016 | Choi | G06T 7/593 382/218 |
| 2016/0150210 A1* | 5/2016 | Chang | G06T 7/593 382/154 |

FOREIGN PATENT DOCUMENTS

| | | | |
|---|---|---|---|
| KR | 2013-0057324 A | 5/2013 | |
| KR | 10-1372843 B1 | 3/2014 | |

OTHER PUBLICATIONS

X. Mei, "On Building an Accurate Stereo Matching System on Graphics Hardware", IEEE International Conference on Computer Vision Workshops, 2011, 8pgs, China.

Q.Yang, "A Non-Local Cost Aggregation Method for Stereo Matching", Computer Vision and Pattern Recognition (CVPR), IEEE Conference, 2012, 8pgs.

X. Mei, "Segment-Tree based Cost Aggregation for Stereo Matching", Computer Vision Foundation, 2013, 8pgs, China.

K. Yoon, "Adaptive Support-Weight Approach for Correspondence Search", IEEE Transactions on Pattern Analysis and Machine Intelligence, vol. 28, No. 4, IEEE Computer Society, Apr. 2006, 7pgs.

A. Hosni, "Fast Cost-Volume Filtering for Visual Correspondence and Beyond", IEEE IEEE Transactions on Pattern Analysis and Machine Intelligence, vol. 35, No. 2, Feb. 2013, 8pgs.

Y. Boykov, "Fast Approximate Energy Minimization via Graph Cuts", IEEE Transactions on Pattern Analysis and Machine Intelligence, vol. 23, No. 11, Nov. 2001, 18pgs.

J. Sun, "Stereo Matching Using Belief Propagation", IEEE Computer Society, IEEE Transactions on Pattern Analysis and Machine Intelligence, vol. 25, No. 7, Jul. 2003, 14pgs, China.

X.Hu, "A Quantitative Evaluation of Confidence Measures for Stereo Vision", IEEE Transactions on Pattern Analysis and Machine Intelligence, vol. 34, No. 11, Nov. 2012, 13pgs.

D. Pfeiffer, "Exploiting the Power of Stereo Confidences", Computer Vision Foundation, 2013, 8pgs, Germany.

R. Haeusler, "Ensemble Learning for Confidence Measures in Stereo Vision", IEEE, 2013, 8pgs.

\* cited by examiner

FIG. 7
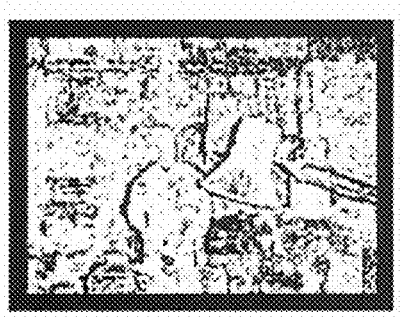
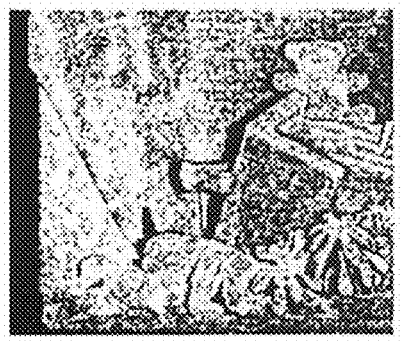
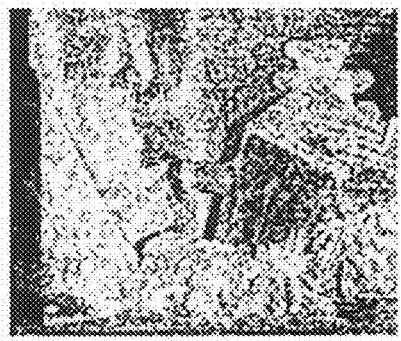
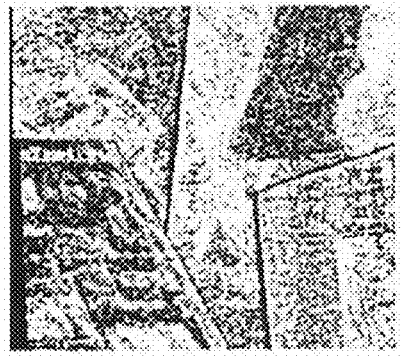
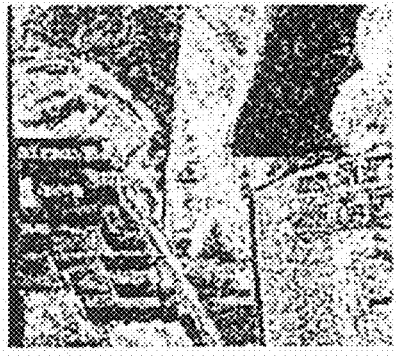
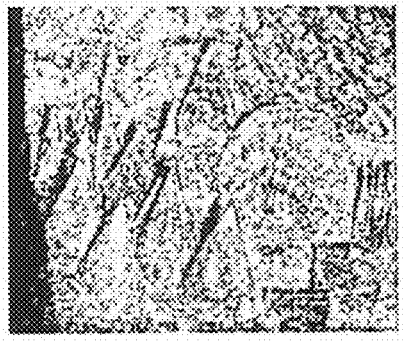

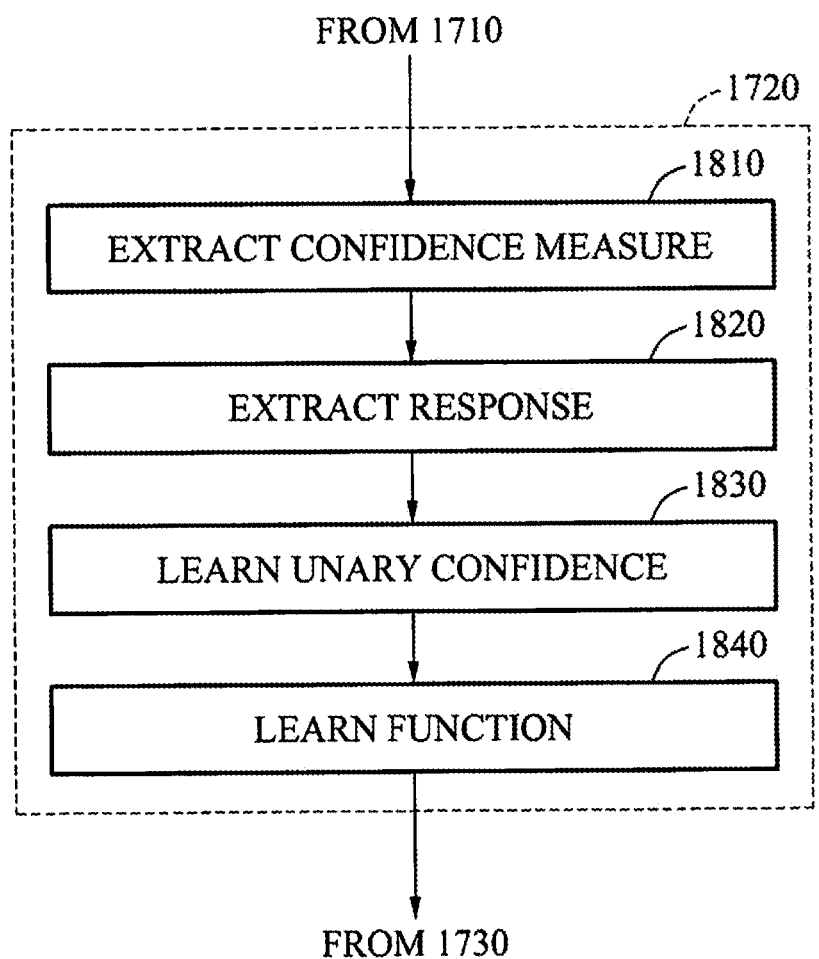

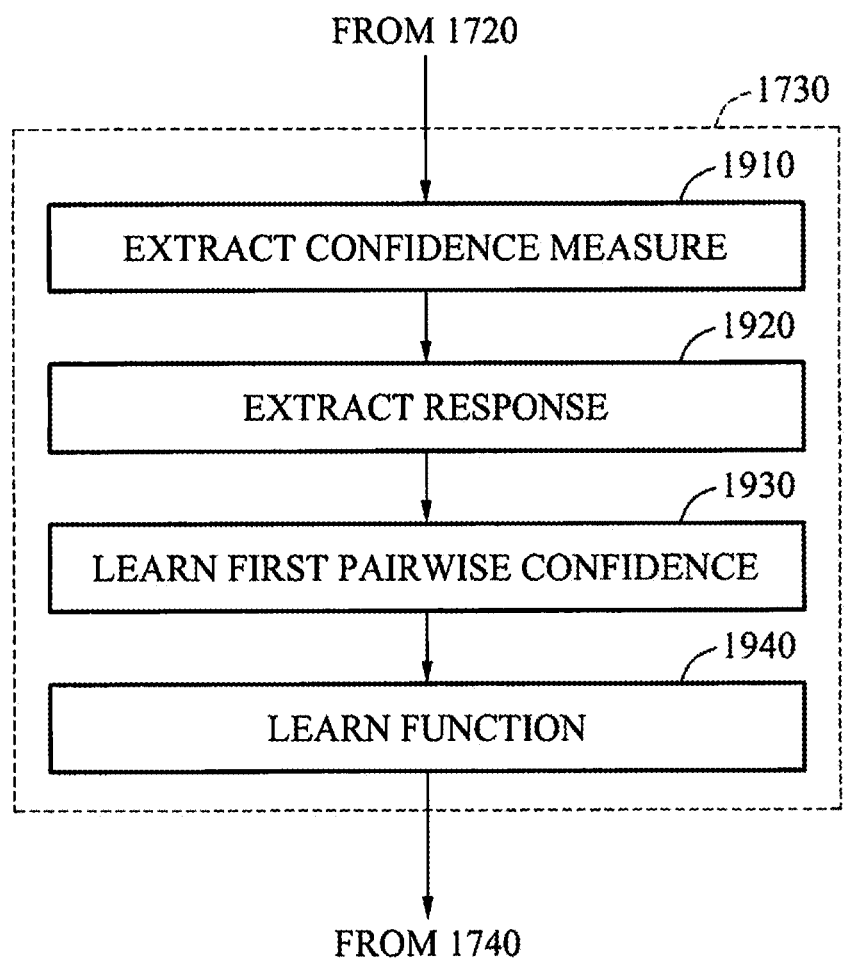

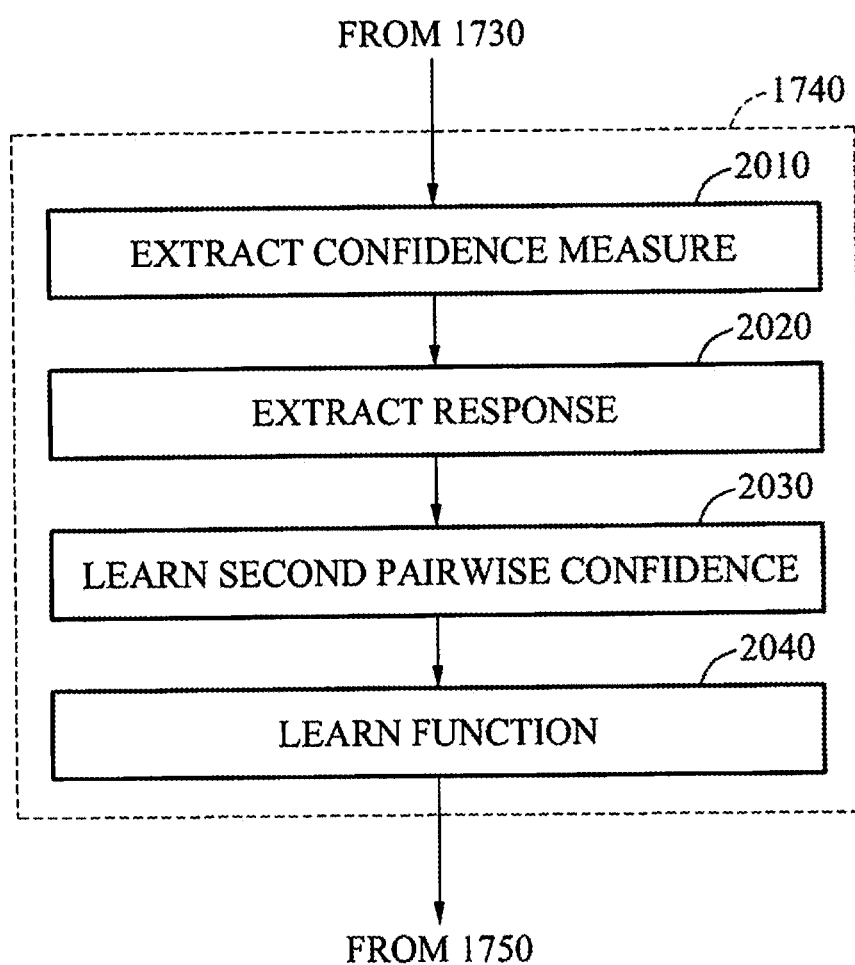

STEREO MATCHING APPARATUS AND METHOD THROUGH LEARNING OF UNARY CONFIDENCE AND PAIRWISE CONFIDENCE

CROSS-REFERENCE TO RELATED APPLICATION

This application claims the priority benefit of Korean Patent Application No. 10-2014-0091042, filed on Jul. 18, 2014, in the Korean Intellectual Property Office, the entire disclosure of which is incorporated herein by reference in its entirety.

BACKGROUND

1. Field

At least one example embodiment relates to a stereo matching apparatus and method, such as, an apparatus and method for performing stereo matching at a minimum cost, using a cost function determined by learning a confidence associated with a pixel.

2. Description of the Related Art

Due to commercialization of a three-dimensional (3D) image representation technology using a left image and a right image, stereo matching was developed to search for corresponding pixels between the left image and the right image.

Stereo matching allows a left image and a right image to be matched to each other, to output binocular disparity information of the left image and disparity information of the right image. In the stereo matching, a data cost used to determine a similarity between a pixel of the left image and pixels of the right image that are likely to correspond to the pixel of the left image may be determined. The stereo matching may determine binocular disparity information used to minimize a cost function including the data cost as the binocular disparity information of the left image and the disparity information of the right image.

However, because a size of an object in the left image or the right image is greater than a size of a pixel, and pixels in each of objects are similar to each other in color, a binocular disparity between a pixel of the left image and a pixel of the right image that does not correspond to the pixel of the left image may be less than a binocular disparity between the pixel of the left image and a pixel of the right image that corresponds to the pixel of the left image. Additionally, an error may occur during minimizing of a cost function and accordingly, incorrect binocular disparity information may be determined as the binocular disparity information of the left image and the binocular disparity information of the right image.

Accordingly, a cost function to minimize an error occurring in a stereo matching process is required.

SUMMARY

At least one example embodiment relates to a stereo matching method.

According to an example embodiment, a stereo matching method includes determining a pairwise confidence representing a relationship between a current pixel and a neighboring pixel in a left image and a right image, determining a cost function of stereo matching based on the pairwise confidence, and performing the stereo matching between the left image and the right image using the cost function.

At least one example embodiment provides that the determining the pairwise confidence may include determining a first pairwise confidence representing a relationship between the current pixel and the neighboring pixel in a current frame, and determining a second pairwise confidence representing a relationship between the current pixel in the current frame and the neighboring pixel in a previous frame.

At least one example embodiment provides that the determining the first pairwise confidence may include extracting a confidence measure associated with a similarity between a binocular disparity of the current pixel and a binocular disparity of the neighboring pixel, a data cost of the left image and a data cost of the right image, extracting a response to the confidence measure from discontinuity information, the discontinuity information being based on the left image and the right image; and determining a relationship between the extracted confidence measure and the extracted response.

At least one example embodiment provides that the confidence measure is associated with at least one of a color similarity between the current pixel and the neighboring pixel and a location similarity between the current pixel and the neighboring pixel.

At least one example embodiment provides that the determining the second pairwise confidence may include extracting a confidence measure associated with a similarity between a binocular disparity of the previous frame and a binocular disparity of the current frame, a data cost of the left image, and a data cost of the right image, extracting a response to the confidence measure from a binocular disparity video, and determining a relationship between the extracted confidence measure and the extracted response.

At least one example embodiment provides that the determining the cost function may include determining the cost function based on a data cost of the left image, a data cost of the right image, a similarity between a binocular disparity of the current pixel and a binocular disparity of the neighboring pixel, and the first pairwise confidence.

At least one example embodiment provides that the stereo matching method may further include determining a unary confidence associated with a data cost of the current pixel, and that the determining the cost function determines the cost function based on the unary confidence and the pairwise confidence.

At least one example embodiment provides that the determining of the unary confidence may include extracting a confidence measure associated with whether the current pixel is included in an occlusion area, a data cost of the left image, and a data cost of the right image, extracting a response to the confidence measure from occlusion area information, the occlusion area being based on the left image and the right image; and determining a relationship between the extracted confidence measure and the extracted response.

At least one example embodiment provides that the confidence measure is associated with at least one of a uniqueness of a minimized data cost, a specificity of the minimized data cost, whether the current pixel is included in the occlusion area, and a texture included in the current pixel.

At least one example embodiment provides that the determining the unary confidence may include extracting a confidence measure associated with an accuracy of a binocular disparity of the current, a data cost of the left image, and a data cost of the right image, extracting a response to the confidence measure from binocular disparity information, the binocular disparity information being based on the left image and the right image, and determining a relationship between the extracted confidence measure and the extracted response.

At least one example embodiment provides that the confidence measure is associated with at least one of whether a minimized data cost of the left image is identical to a minimized data cost of the right image, whether the current pixel is included in the occlusion area, and a texture included in the current pixel.

At least one example embodiment relates to a stereo matching method.

According to another example embodiment, a stereo matching method includes determining a unary confidence representing whether a current pixel is included in an occlusion area, determining a cost function of stereo matching based on the unary confidence, and performing the stereo matching between a left image and a right image at a cost using the cost function.

At least one example embodiment provides that the determining the unary confidence may include extracting a confidence measure associated with whether the current pixel is included in the occlusion area, a data cost of the left image, and a data cost of the right image, extracting a response to the confidence measure from occlusion area information, the occlusion area information being based on the left image and the right image; and determining a relationship between the extracted confidence measure and the extracted response.

At least one example embodiment provides that the stereo matching method may further include determining a pairwise confidence representing a relationship between the current pixel and a neighboring pixel, and that the determining the cost function determines the cost function based on the unary confidence and the pairwise confidence.

At least one example embodiment relates to a stereo matching apparatus.

According to another example embodiment, a stereo matching apparatus includes a pairwise confidence learner configured to determine a pairwise confidence representing a relationship between a current pixel and a neighboring pixel in a left image and a right image, a cost function determiner configured to determine a cost function of stereo matching based on the pairwise confidence, and a stereo matcher configured to perform stereo matching between the left image and the right image at a cost using the cost function.

At least one example embodiment provides that the pairwise confidence learner may include a first pairwise confidence learner configured to determine a first pairwise confidence representing a relationship between the current pixel and the neighboring pixel that are included in a current frame, or a second pairwise confidence learner configured to determine a second pairwise confidence representing a relationship between the current pixel in the current frame and a neighboring pixel in a previous frame.

At least one example embodiment provides that the first pairwise confidence learner may include a confidence measure extractor configured to extract a confidence measure associated with a similarity between a binocular disparity of the current pixel and a binocular disparity of the neighboring pixel, a data cost of the left image and a data cost of the right image, a response extractor configured to extract a response to the confidence measure from discontinuity information, the discontinuity information being based on the left image and the right image; and a confidence learner configured to determine a relationship between the extracted confidence measure and the extracted response.

At least one example embodiment provides that the confidence measure is associated with at least one of a color similarity between the current pixel and the neighboring pixel and a location similarity between the current pixel and the neighboring pixel.

At least one example embodiment provides that the second pairwise confidence learner may include a confidence measure extractor configured to extract a confidence measure associated with a similarity between a binocular disparity of the previous frame and a binocular disparity of the current frame, a data cost of the left image and a data cost of the right image, a response extractor configured to extract a response to the confidence measure from a verified binocular disparity video, and a confidence learner configured to determine a relationship between the extracted confidence measure and the extracted response.

At least one example embodiment provides that the cost function determiner is configured to determine the cost function based on a data cost of the left image, a data cost of the right image, a similarity between a binocular disparity of the current pixel and a binocular disparity of the neighboring pixel, and the first pairwise confidence.

At least one example embodiment provides that the stereo matching apparatus may further include a unary confidence learner to learn a unary confidence associated with a data cost of the current pixel, and that the cost function determiner may determine the cost function based on the unary confidence and the pairwise confidence.

At least one example embodiment provides that the unary confidence learner may include a confidence measure extractor to extract a confidence measure associated with whether the current pixel is included in an occlusion area, from the left image, the right image, a data cost of the left image, and a data cost of the right image, a response extractor to extract a response to the confidence measure from verified occlusion area information, and a confidence learner to learn a relationship between the extracted confidence measure and the extracted response.

At least one example embodiment provides that the confidence measure extractor may extract at least one of a confidence measure associated with a uniqueness or specificity of a minimized data cost, a confidence measure associated with whether the current pixel is included in the occlusion area, and a confidence measure associated with a texture included in the current pixel.

At least one example embodiment provides that the unary confidence learner may include a confidence measure extractor to extract a confidence measure associated with an accuracy of a binocular disparity of the current pixel from the left image, the right image, a data cost of the left image, and a data cost of the right image, a response extractor to extract a response to the confidence measure from verified binocular disparity information, and a confidence learner to learn a relationship between the extracted confidence measure and the extracted response.

At least one example embodiment provides that the confidence measure extractor may extract at least one of a confidence measure associated with whether a minimized data cost of the left image is identical to a minimized data cost of the right image, a confidence measure associated with whether the current pixel is included in the occlusion area, and a confidence measure associated with a texture included in the current pixel.

At least one example embodiment relates to a stereo matching apparatus.

According to another example embodiment, a stereo matching apparatus includes a unary confidence learner to learn a unary confidence representing whether a current pixel is included in an occlusion area, a cost function determiner to determine a cost function of stereo matching based on the unary confidence, and a stereo matcher to perform stereo matching between a left image and a right image at a minimum cost using the cost function.

At least one example embodiment provides that the unary confidence learner may include a confidence measure extractor to extract a confidence measure associated with whether the current pixel is included in the occlusion area, from the left image, the right image, a data cost of the left image, and a data cost of the right image, a response extractor to extract a response to the confidence measure from verified occlusion area information, and a confidence learner to learn a relationship between the extracted confidence measure and the extracted response.

At least one example embodiment provides that the stereo matching apparatus may further include a pairwise confidence learner to learn a pairwise confidence representing a relationship between the current pixel and a neighboring pixel, and that the cost function determiner may determine the cost function based on the unary confidence and the pairwise confidence.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 7 illustrates an example of verified binocular disparity information and binocular disparity information estimated based on a learned unary confidence according to an example embodiment;

FIG. 18 illustrates an operation of learning a unary confidence in the stereo matching method of FIG. 17;

FIG. 19 illustrates an operation of learning a first pairwise confidence in the stereo matching method of FIG. 17; and FIG. 20 illustrates an operation of learning a second pairwise confidence in the stereo matching method of FIG. 17.

DETAILED DESCRIPTION

Figure 1:
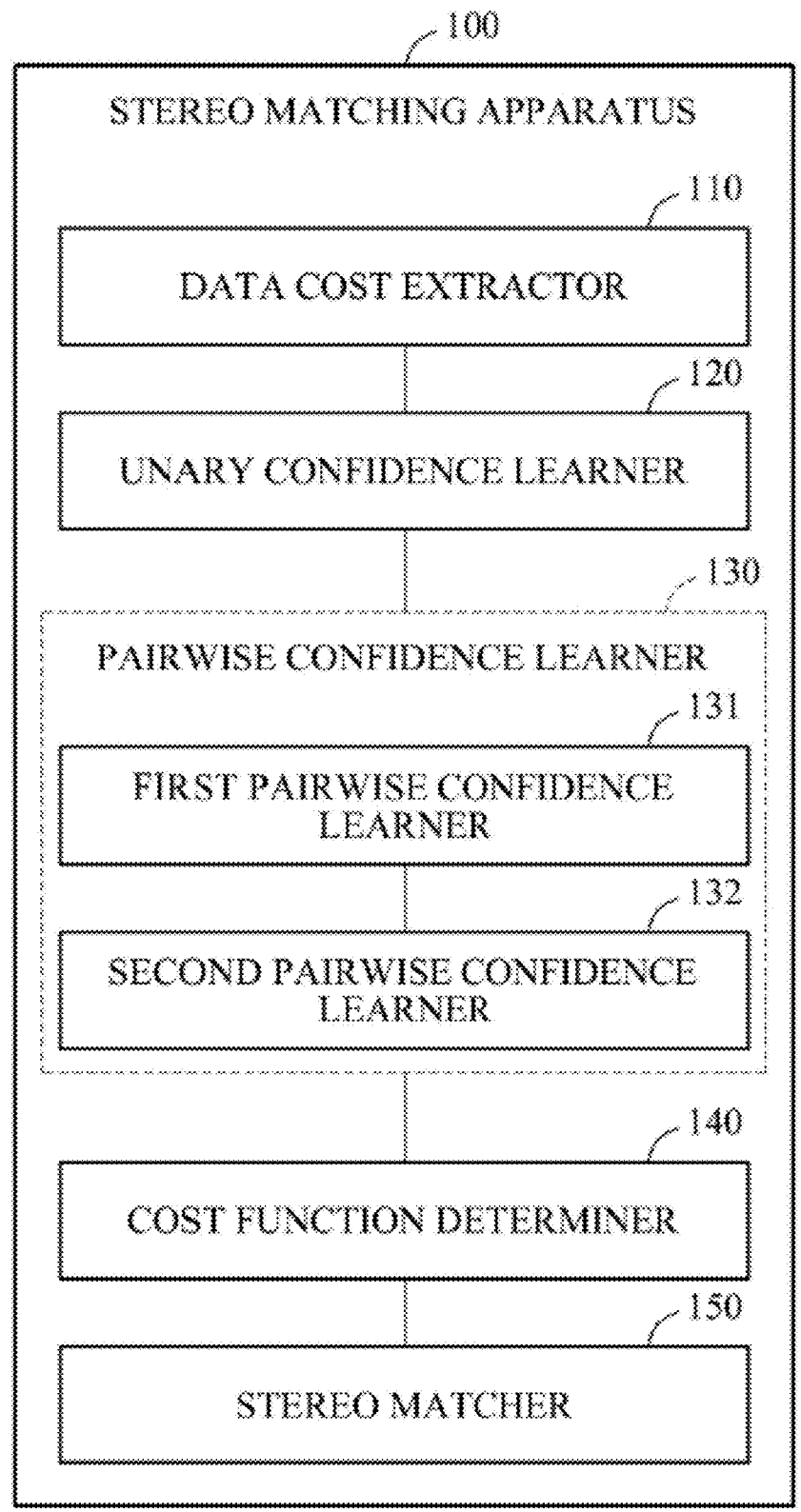
FIG. 1 illustrates a structure of a stereo matching apparatus according to an example embodiment.

Reference will now be made in detail to example embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

A stereo matching method according to example embodiments may be performed by a stereo matching apparatus.

FIG. 1 illustrates a structure of a stereo matching apparatus 100 according to an example embodiment.

Referring to FIG. 1, the stereo matching apparatus 100 may include a data cost extractor 110, a unary confidence learner 120, a pairwise confidence learner 130, a cost function determiner 140, and a stereo matcher 150. The stereo matching apparatus 100 may determine a cost function of stereo matching.

The data cost extractor 110, the unary confidence learner 120, the pairwise confidence learner 130, the cost function determiner 140, and the stereo matcher 150 may be hardware, firmware, hardware executing software or any combination thereof. When at least one of the data cost extractor 110, the unary confidence learner 120, the pairwise confidence learner 130, the cost function determiner 140, and the stereo matcher 150 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the data cost extractor 110, the unary confidence learner 120, the pairwise confidence learner 130, the cost function determiner 140, and the stereo matcher 150. CPUs, DSPs, ASICs and FPGAs may generally be referred to as processors and/or microprocessors.

In the event where at least one of the data cost extractor 110, the unary confidence learner 120, the pairwise confidence learner 130, the cost function determiner 140, and the stereo matcher 150 is a processor executing software, the processor is configured as a special purpose machine to execute the software, stored in a storage medium, to perform the functions of the at least one of the data cost extractor 110, the unary confidence learner 120, the pairwise confidence learner 130, the cost function determiner 140, and the stereo matcher 150. In such an embodiment, the processor may include one or more Central Processing Units (CPUs), digital signal processors (DSPs), application-specific-integrated-circuits (ASICs), field programmable gate arrays (FPGAs) computers.

The data cost extractor 110 may extract a data cost of a left image and a data cost of a right image from the left image and the right image, respectively.

The unary confidence learner 120 may learn a unary confidence associated with a data cost of a current pixel, based on a binocular disparity between the left image and the right image. The unary confidence may be determined based on an accuracy of a binocular disparity of the current pixel, or whether the current pixel is included in an occlusion area.

The unary confidence learner 120 may extract a confidence measure from the left image, the right image, and the data costs extracted by the data cost extractor 110, and may learn the unary confidence. The confidence measure may be associated with the accuracy of the binocular disparity of the current pixel, or whether the current pixel is included in the occlusion area. The data cost of the left image may be, for example, a similarity between a current pixel included in the left image and a pixel that is included in the right image and that is likely to correspond to the current pixel in the left image. Additionally, the data cost of the right image may be, for example, a similarity between a current pixel included in the right image and a pixel that is included in the left image and that is likely to correspond to the current pixel in the right image.

A configuration and an operation of the unary confidence learner 120 will be further described with reference to FIGS. 4 through 9.

The pairwise confidence learner 130 may learn a pairwise confidence representing a relationship between a current pixel and a neighboring pixel. The pairwise confidence may include, for example, one of a first pairwise confidence and a second pairwise confidence. The first pairwise confidence may represent a relationship between a current pixel and a neighboring pixel that are included in a current frame, and the second pairwise confidence may represent a relationship between a current pixel included in a current frame and a neighboring pixel included in a previous frame.

The pairwise confidence learner 130 may include a first pairwise confidence learner 131, and a second pairwise confidence learner 132, as shown in FIG. 1.

The first pairwise confidence learner 131 and the second pairwise confidence learner 132 may be hardware, firmware, hardware executing software or any combination thereof. When at least one of the first pairwise confidence learner 131 and the second pairwise confidence learner 132 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the first pairwise confidence learner 131 and the second pairwise confidence learner 132.

In the event where at least one of the first pairwise confidence learner 131 and the second pairwise confidence learner 132 is a processor executing software, the processor is configured as a special purpose machine to execute the software, stored in a storage medium, to perform the functions of the first pairwise confidence learner 131 and the second pairwise confidence learner 132. In such an embodiment, the processor may include one or more Central Processing Units (CPUs), digital signal processors (DSPs), application-specific-integrated-circuits (ASICs), field programmable gate arrays (FPGAs) computers.

The first pairwise confidence learner 131 may learn the first pairwise confidence. The first pairwise confidence may be determined based on whether a boundary between the current pixel and the neighboring pixel exists. The boundary may be, for example, a boundary between an object and a background, or between the object and another object in the current frame.

Additionally, the first pairwise confidence learner 131 may extract a confidence measure associated with a similarity between the current pixel and the neighboring pixel from the left image, the right image, and the data costs extracted by the data cost extractor 110, and may learn the first pairwise confidence.

A configuration and an operation of the first pairwise confidence learner 131 will be further described with reference to FIGS. 10 through 13.

The second pairwise confidence learner 132 may learn the second pairwise confidence, for example, a temporal confidence. The second pairwise confidence may be determined based on whether the current pixel in the current frame is similar to a pixel that is included in the previous frame and that corresponds to the current pixel.

A configuration and an operation of the second pairwise confidence learner 132 will be further described with reference to FIGS. 15 and 16.

The cost function determiner 140 may determine a cost function of stereo matching, based on the pairwise confidence learned by the pairwise confidence learner 130. For example, the cost function determiner 140 may determine the cost function, based on at least one of the data cost of the left image, the data cost of the right image, a discontinuity cost, the unary confidence, the first pairwise confidence, and the second pairwise confidence. The discontinuity cost may be, for example, a similarity between a binocular disparity of a current pixel and a binocular disparity of a neighboring pixel.

In an example, the cost function determiner 140 may determine a cost function E(D) of the left image, based on the data cost of the left image, the discontinuity cost, and the first pairwise confidence, as shown in Equation 1 below. Additionally, the cost function determiner 140 may determine a cost function of the right image by substituting the data cost of the right image for the data cost of the left image in Equation 1.

$$E(D) = \sum_x c_x(d_x) + \lambda \sum_{(x,y) \in N} k(Q_{x,y}) s(d_x, d_y) \qquad \text{[Equation 1]}$$

In Equation 1, $c_x(d_x)$ denotes a data cost of a left image, and may be a function to determine a similarity between a current pixel included in a left image and a pixel that is included in a right image and that is likely to correspond to the current pixel.

Additionally, $s(d_x, d_y)$ denotes a function to determine a discontinuity cost representing a similarity between a binocular disparity $d_x$ of a current pixel and a binocular disparity $d_y$ of a neighboring pixel. A value of the function $s(d_x, d_y)$ may be reduced when the discontinuity cost increases. The similarity between the binocular disparities $d_x$ and $d_y$ may also be defined as a smoothness cost.

In addition, $\lambda$ denotes a regularization coefficient, N denotes a set of neighboring pixels adjacent to a current pixel, and $k(Q_{x,y})$ denotes a function to output a coefficient of stereo matching based on an input first pairwise confidence $Q_{x,y}$. The set N may be, for example, a neighborhood system.

In an example, when a binocular disparity of a current pixel x and a binocular disparity of a neighboring pixel y are similar to each other, the first pairwise confidence $Q_{x,y}$ may be a coefficient with a value of "1." In another example, when the binocular disparity of the current pixel x and the binocular disparity of the neighboring pixel y are different from each other, the first pairwise confidence $Q_{x,y}$ may be a coefficient with a value of "0."

When the cost function determiner 140 determines the cost function E(D) of the left image, based on the data cost of the left image, the discontinuity cost, and the first pairwise confidence, as shown in Equation 1, the stereo matching apparatus 100 may include the data cost extractor 110, the first pairwise confidence learner 131, and the cost function determiner 140.

In another example, the cost function determiner 140 may determine the cost function E(D) of the left image, based on the data cost of the left image, the discontinuity cost, the unary confidence, and the first pairwise confidence, as shown in Equation 2 below. Additionally, the cost function determiner 140 may determine the cost function of the right image by substituting the data cost of the right image for the data cost of the left image in Equation 2.

$$E(D) = \sum_x h(P_x) c_x(d_x) + \lambda \sum_{(x,y) \in N} k(Q_{x,y}) s(d_x, d_y) \qquad \text{[Equation 2]}$$

In Equation 2, $h(P_x)$ denotes a function to output a coefficient of stereo matching based on an input unary confidence $P_x$. In an example, when an accurate binocular disparity is found by minimizing a data cost $c_x(d_x)$ of a pixel x, the unary confidence $P_x$ may be a coefficient with a value of "1." In another example, when an accurate binocular disparity is not found by minimizing the data cost $c_x(d_x)$, the unary confidence $P_x$ may be a coefficient with a value of "0."

When the cost function determiner 140 determines the cost function E(D) of the left image, based on the data cost of the left image, the discontinuity cost, the unary confidence, and the first pairwise confidence, as shown in Equation 2, the stereo matching apparatus 100 may include the data cost extractor 110, the unary confidence learner 120, the first pairwise confidence learner 131, and the cost function determiner 140.

In still another example, the cost function determiner 140 may determine the cost function E(D) of the left image, based on the data cost of the left image, the discontinuity cost, the unary confidence, the first pairwise confidence, and the second pairwise confidence, as shown in Equation 3 below.

$$E(D) = \sum_x h(P_x) c_x(d_x) + \qquad \text{[Equation 3]}$$
$$\lambda \sum_{(x,y) \in N_s} k(Q_{x,y}) s(d_x, d_y) + \gamma \sum_{(x,y) \in N_t} k'(R_{x,y}) s(d_x, d_y^{t-1})$$

In Equation 3, $k'(R_{x,y})$ denotes a function to output a coefficient of stereo matching based on an input second pairwise confidence $R_{x,y}$. Additionally, $N_s$ denotes a set of neighboring pixels adjacent to a current pixel in a current frame, and $N_t$ denotes a set of previous frames temporally close to a current frame. The set $N_s$ may be, for example, a spatial neighborhood system, and the set $N_t$ may be, for example, a temporal neighborhood system.

In yet another example, the cost function determiner 140 may determine the cost function E(D) of the left image, based on the data cost of the left image, the discontinuity cost, and the second pairwise confidence, as shown in Equation 4 below.

$$E(D) = \sum_x c_x(d_x) + \lambda \sum_{(x,y) \in N_s} s(d_x, d_y) + \gamma \sum_{(x,y) \in N_t} k'(R_{x,y}) s(d_x, d_y^{t-1})$$ [Equation 4]

When the cost function determiner 140 determines the cost function E(D) of the left image, based on the data cost of the left image, the discontinuity cost, and the second pairwise confidence, as shown in Equation 4, the stereo matching apparatus 100 may include the data cost extractor 110, the second pairwise confidence learner 132, and the cost function determiner 140.

The stereo matcher 150 may perform stereo matching between the left image and the right image at a minimum cost, using the cost function determined by the cost function determiner 140, and may output binocular disparity information of the left image and binocular disparity information of the right image.

The stereo matching apparatus 100 may learn a first pairwise confidence representing whether a boundary between a current pixel and a neighboring pixel exists, and may determine a cost function based on the learned first pairwise confidence. Accordingly, an accuracy of stereo matching may be increased.

Additionally, the stereo matching apparatus 100 may learn a unary confidence representing whether a current pixel is included in an occlusion area, and may determine a cost function based on the learned unary confidence. Accordingly, the accuracy of stereo matching may be increased.

Furthermore, the stereo matching apparatus 100 may learn a second pairwise confidence representing a similarity between a binocular disparity of a current pixel in a current frame and a binocular disparity of a neighboring pixel in a previous frame, and may determine a cost function based on the learned second pairwise confidence. Accordingly, the accuracy of stereo matching may be increased.

Figure 2:
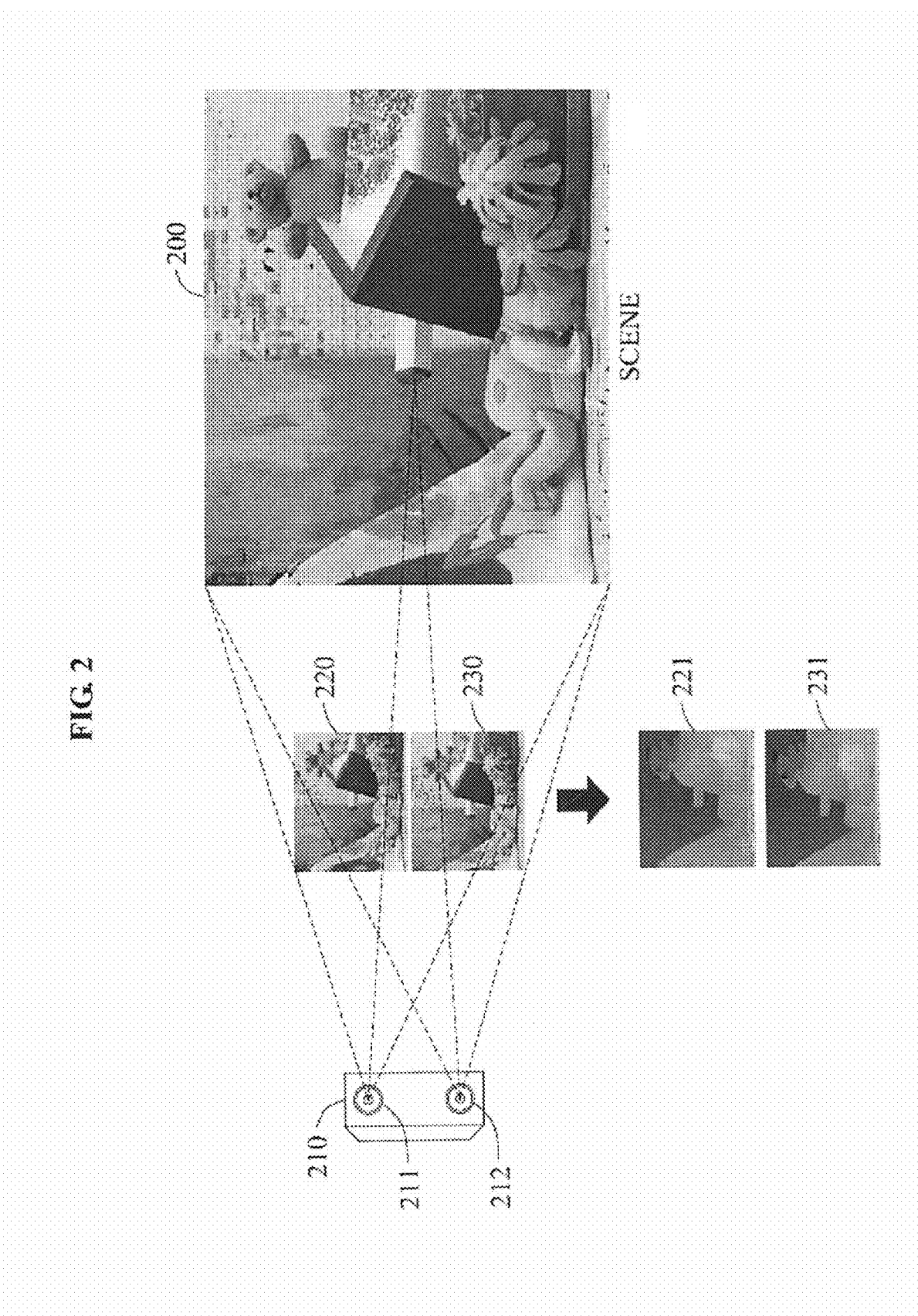
FIG. 2 illustrates stereo matching using a left image and a right image.

FIG. 2 illustrates stereo matching using a left image and a right image.

The stereo matching refers to a scheme of searching for corresponding pixels between a left image 220 and a right image 230 to represent a three-dimensional (3D) image. Referring to FIG. 2, the left image 220 and the right image 230 may be generated by a first camera 211 and a second camera 212 of a stereo camera 210 simultaneously capturing a scene 200. The first camera 211 and the second camera 212 may be placed in different viewpoints. For example, the stereo matching apparatus 100 of FIG. 1 may search for corresponding pixels between the left image 220 and the right image 230 through the stereo matching, and may determine a distance between the stereo camera 210 and a location of the scene 200 represented by the corresponding pixels through a triangulation.

For example, the stereo matching apparatus 100 may match the left image 220 and the right image 230 that are input, and may output binocular disparity information 221 of the left image 220 and binocular disparity information 231 of the right image 230. In this example, each of the binocular disparity information 221 and 231 may be a binocular disparity map in which objects or backgrounds with the same binocular disparity are represented using the same color in the left image 220 and the right image 230.

Additionally, a binocular disparity of each of pixels included in the left image 220 and the right image 230 may be proportional to a brightness of the binocular disparity map. For example, a pixel representing an object closest to the stereo camera 210 in the scene 200 may have a largest binocular disparity and accordingly, may be most brightly displayed in the binocular disparity map. Additionally, a pixel representing an object or a background farthest away from the stereo camera 210 in the scene 200 may have a smallest binocular disparity and accordingly, may be most darkly displayed in the binocular disparity map.

The stereo matching apparatus 100 may search for the corresponding pixels between the left image 220 and the right image 230, based on binocular disparity information. For example, a current pixel of the left image 220 may correspond to a pixel that is included in the right image 230 and that is horizontally moved from the current pixel based on binocular disparity information of the current pixel.

Accordingly, to accurately search for the corresponding pixels between the left image 220 and the right image 230, an accuracy of binocular disparity information generated by matching the left image 220 and the right image 230 may need to be increased.

Figure 3:
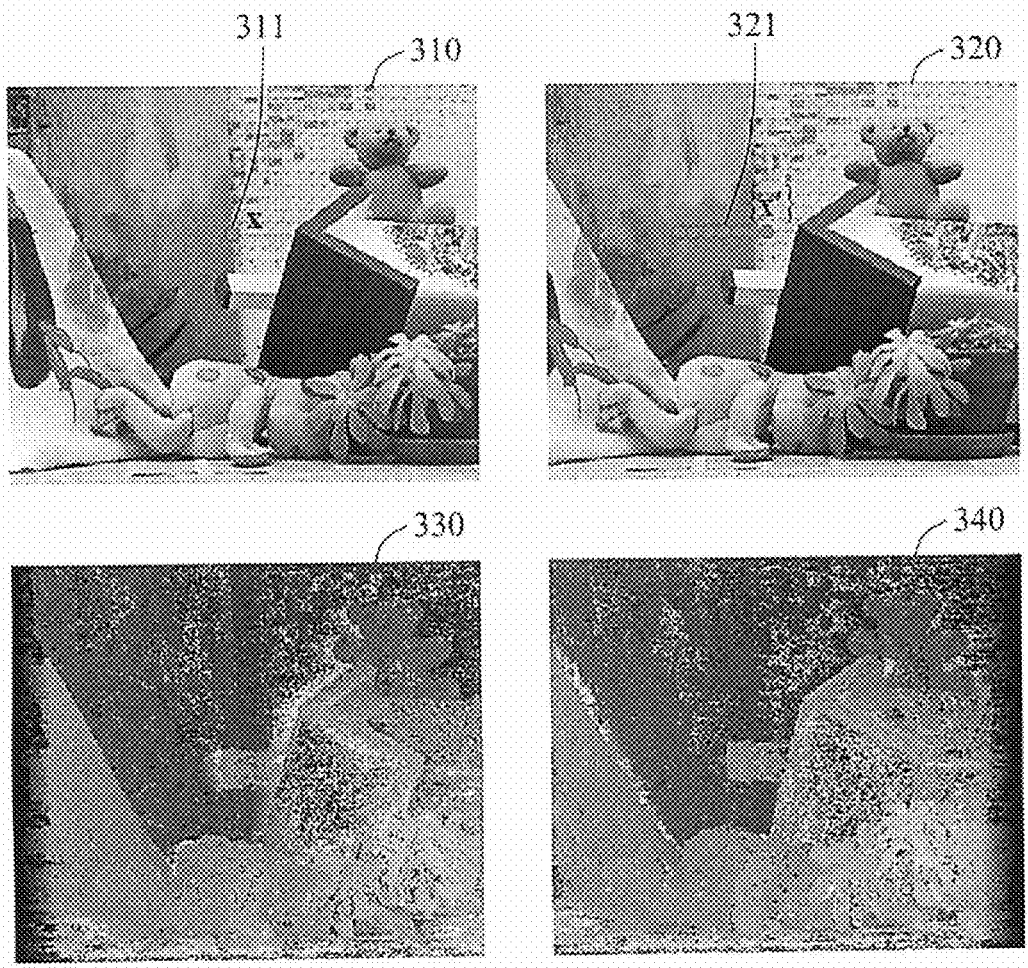
FIG. 3 illustrates an example of a binocular disparity between a left image and a right image and a data cost extracted based on the binocular disparity according to a related art.

FIG. 3 illustrates an example of a binocular disparity between a left image and a right image and a data cost extracted based on the binocular disparity according to a related art.

When a pair of cameras included in a stereo camera are placed in parallel, a vertical coordinate y of a pixel 311 of a left image 310 may be identical to a vertical coordinate y' of a pixel 321 of a right image 320 corresponding to the pixel 311. Conversely, a horizontal coordinate x of the pixel 311 may be different from a horizontal coordinate x' of the pixel 321, as shown in FIG. 3. The pixel 321 may be positioned in a left side of the pixel 311. A binocular disparity $d_x$ of the left image 310 may have a value of "x−x'." For example, when the horizontal coordinate x' of the pixel 321 corresponding to the pixel 311 is estimated, a binocular disparity of the pixel 311 may be determined. Additionally, a binocular disparity $d_{x'}$ of the right image 320 may have a value of "x'−x."

A data cost extractor in a stereo matching apparatus according to a related art may generate a set {x'} by grouping pixels of the right image 320 that are likely to correspond to the pixel 311 of the left image 310. The set {x'} may include, as elements, pixels with horizontal coordinates that are likely to be estimated as x', as shown in Equation 5 below.

$$\{x'\} = \{x': x' = x - d_x, y' = y, d_x \in \{0, \ldots, d_{max}\}\}$$ [Equation 5]

As defined in Equation 5, the horizontal coordinates x' of the pixels in the set {x'} may have different values, that is, "x−$d_x$," and vertical coordinates y' of the pixels may have the same value, that is, "y."

The data cost extractor may determine a data cost $c_x(d_x)$ to determine a similarity between the pixel 311 and the pixels in the set {x'}. For example the data cost extractor 110 may determine the data cost $c_x(d_x)$ as shown in Equation 6 below.

$$c_x(d_x) = f(d_x; x, I^L, I^R)$$ [Equation 6]

When a similarity between a feature amount of a pixel in a left image $I^L$ and a feature amount of a pixel in a right image $I^R$ increases, a value of the data cost $c_x(d_x)$ may decrease. Additionally, when the similarity decreases, the value of the data cost $c_x(d_x)$ may increase. Each of the feature amounts may be determined based on a color or a texture of each of the pixels.

However, when a binocular disparity $d^*_x$ of the pixel 311 is determined using Equation 7 shown below, the stereo matching apparatus may output inaccurate binocular disparity information 330 of the left image 310 and inaccurate binocular disparity information 340 of the right image 320. Referring to Equation 7, a binocular disparity used to minimize data costs of all binocular disparities for the pixel 311 may be determined as $d^*_x$.

$$d^*_x = \underset{0 \le d \le d_{max}}{\operatorname{argmin}} c_x(d) \quad \text{[Equation 7]}$$

Because a size of an object in the left image or the right image is greater than a size of a pixel, and pixels in each of objects are similar to each other in color, a binocular disparity between the pixel 311 and a pixel that does not correspond to the pixel 311 may be less than a binocular disparity between the pixel 321 and the pixel 311. Accordingly, when the binocular disparity between the pixel 311 and the pixel that does not correspond to the pixel 311 is determined as the binocular disparity of the pixel 311, the stereo matching apparatus may output the inaccurate binocular disparity information 330 and 340, as shown in FIG. 3.

Accordingly, the stereo matching apparatus 100 of FIG. 1 may determine a cost function to determine binocular disparity information of a current pixel, based on a pairwise confidence representing a relationship between the current pixel and a neighboring pixel adjacent to the current pixel and thus, it is possible to increase an accuracy of the binocular disparity information.

Figure 4:
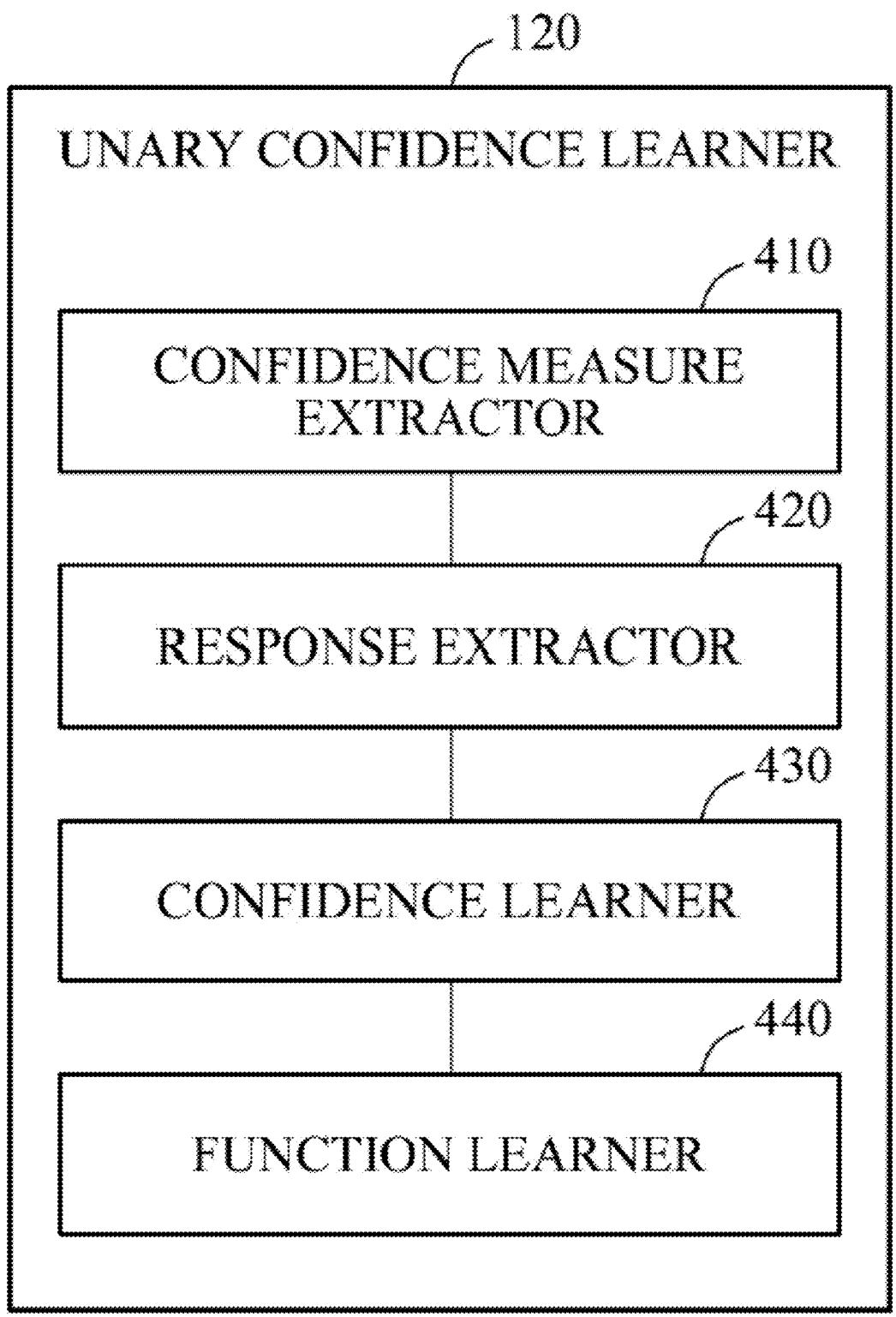
FIG. 4 illustrates a structure of a unary confidence learner in the stereo matching apparatus of FIG. 1.

FIG. 4 illustrates a structure of the unary confidence learner 120 in the stereo matching apparatus 100 of FIG. 1.

Referring to FIG. 4, the unary confidence learner 120 may include a confidence measure extractor 410, a response extractor 420, a confidence learner 430, and a function learner 440.

The unary confidence learner 120 may learn a unary confidence, based on an accuracy of a binocular disparity of a current pixel, or whether the current pixel is included in an occlusion area.

In an example in which the unary confidence learner 120 learns a unary confidence, based on the accuracy of the binocular disparity of the current pixel, an operation of each of the confidence measure extractor 410, the response extractor 420, the confidence learner 430, and the function learner 440 is hereinafter described.

The confidence measure extractor 410 may extract a confidence measure associated with the accuracy of the binocular disparity of the current pixel from a left image, a right image, a data cost of the left image, and a data cost of the right image.

The confidence measure extractor 410 may extract at least one of a confidence measure associated with whether a minimized data cost of the left image is identical to a minimized data cost of the right image, a confidence measure associated with whether the current pixel is included in the occlusion area, and a confidence measure associated with a texture included in the current pixel.

For example, the confidence measure extractor 410 may extract a symmetric naive peak ratio and a symmetric maximum likelihood measure, as a confidence measure associated with whether a minimized data cost of the left image is identical to a minimized data cost of the right image. In the present disclosure, the symmetric naive peak ratio and the symmetric maximum likelihood measure may be briefly referred to as the PKRSN and the MLMS, respectively. In this example, a PKRSN $C_{PKRSN}(x,y)$ and an MLMS $C_{MLMS}$ of a current pixel may be defined as shown in Equation 8 below. The following description is provided for a left image, and a confidence measure of a right image may be extracted by applying information used in the left image to the right image.

$$C_{PKRSN}(x, y) = \frac{\min\left(c_2, \min_{d \ne d_1} c^R_{(x-d_1, y)}(d)\right)}{c_1 + \min\left(c_2, \min_{d \ne d_1} c^R_{(x-d_1, y)}(d)\right)} \quad \text{[Equation 8]}$$

$$C_{MLMS}(x, y) = \frac{e^{-c(d_1)/2\sigma^2_{MLM}}}{\sum_d \left(e^{-c(d_1)/2\sigma^2_{MLM}} + e^{-c^R_{(x-d_1, y)}(d)/2\sigma^2_{MLM}}\right) - e^{-c(d_1)/2\sigma^2_{MLM}}}$$

In Equation 8, x denotes a current pixel with coordinates (x,y) in a left image, $C_1$ denotes a minimum value of a data cost $c_x(d_x)$, and $c_2$ denotes a second minimum value of the data cost $c_x(d_x)$. Additionally, $\sigma_{MLM}$ denotes a positive constant, $d_1$ denotes a binocular disparity to minimize the data cost $c_x(d_x)$, and $c^R$ denotes a data cost of a right image. $(x-d_1, y)$ denotes a pixel that is included in the right image and that corresponds to the current pixel x.

Additionally, the confidence measure extractor 410 may extract a maximum similarity measure (MSM), a left-right consistency (LRC), and a left-right difference (LRD), as a confidence measure associated with whether a current pixel is included in an occlusion area. The occlusion area may be observed in either the left image or the right image, and may not be observed in the other image. Additionally, an MSM $C_{MSM}(x,y)$, an LRC $C_{LRC}(x,y)$, and an LRD $C_{LRD}(x,y)$ of the current pixel may be defined as shown in Equation 9 below.

$$C_{MSM}(x, y) = c_1 \quad \text{[Equation 9]}$$

$$C_{LRC}(x, y) = \left| d_1 - \underset{d}{\operatorname{argmin}}\left(c^R_{(x-d_1, y)}(d)\right) \right|$$

$$C_{LRD}(x, y) = \frac{|c_2 - c_1|}{\left| c_1 - \min_d(c_{(x-d_1, y)}(d)) \right| + |c_2 - c_1|}$$

Furthermore, the confidence measure extractor 410 may extract a curvature and a gradient, as a confidence measure associated with whether a sufficient texture is included in a current pixel. A curvature $C_{CUR}(x,y)$ and a gradient $C_{GRAD}(x,y)$ of the current pixel may be defined as shown in Equation 10 below.

$$C_{CUR}(x,y) = \max(|c_1 - c_x(d_1 - 1)|, |c_1 - c_x(d_1 + 1)|)$$

$$C_{GRAD}(x,y) = \max(|I^L(x,y) - I^L(x-1,y)|, |I^L(x,y) - I^L(x+1,y)|) \quad \text{[Equation 10]}$$

The confidence measure extractor 410 may extract confidence measures defined as shown in Equations 8 to 10 for each of pixels included in the right image, and may output the extracted confidence measures as a single vector, that is, a confidence measure vector. For example, a confidence measure vector $a_x$ may be represented as shown in Equation 11 below.

$$a_x = \begin{bmatrix} C_{PKSRN}(x, y) \\ C_{MLMS}(x, y) \\ C_{MSM}(x, y) \\ C_{LRC}(x, y) \\ C_{LRD}(x, y) \\ C_{CUR}(x, y) \\ C_{GRAD}(x, y) \end{bmatrix} \quad \text{[Equation 11]}$$

The response extractor 420 may extract a response to the confidence measure extracted by the confidence measure extractor 410 from verified binocular disparity information, for example, a ground-truth disparity map. The response extracted by the response extractor 420 may be, for example, a response to whether an accurate binocular disparity is determined by minimizing a data cost in a current pixel.

For example, when an accurate binocular disparity is determined by minimizing a data cost in a current pixel, a response $P^*_x$ extracted by the response extractor 420 may be "1." In another example, when an accurate binocular disparity is not determined by minimizing a data cost in a current pixel, the response $P^*_x$ may be "0."

When the confidence measure vector $a_x$ is received from the confidence measure extractor 410, the confidence learner 430 may learn a function $f(a_x)$ to output the response $P^*_x$. For example, the confidence learner 430 may perform classification or regression using a supervised learning scheme, for example, a random forest, or a support vector machine, and may learn the function $f(a_x)$. In this example, the confidence measure vector $a_x$ output from the confidence measure extractor 410 may be, for example, a confidence measure vector extracted from a test image corresponding to verified binocular disparity information.

The learned function $f(a_x)$ may receive, as an input, a confidence measure vector of an actual image for which a cost function is to be determined. Additionally, the learned function $f(a_x)$ may estimate a unary confidence of the actual image.

The function learner 440 may learn a function $h(P_x)$ to output a coefficient of stereo matching based on the unary confidence $P_x$ estimated by the function $f(a_x)$ learned by the confidence learner 430. The function learner 440 may learn the function $h(P_x)$, to minimize a binocular disparity error in the stereo matching. The function $h(P_x)$ may be, for example, a function to apply a weight to a unary confidence, based on an accuracy or error of the unary confidence. For example, when the unary confidence $P_x$ is completely accurate, a result of the function $h(P_x)$ may be identical to the unary confidence $P_x$.

Additionally, the function $h(P_x)$ may be, for example, a simple linear function, or an exponential function.

In an example in which the unary confidence learner 120 learns a unary confidence representing whether a current pixel is included in an occlusion area, an operation of each of the confidence measure extractor 410, the response extractor 420, the confidence learner 430, and the function learner 440 is hereinafter described.

The confidence measure extractor 410 may extract a confidence measure associated with whether the current pixel is included in the occlusion area from a left image, a right image, a data cost of the left image, and a data cost of the right image.

The confidence measure extractor 410 may extract at least one of a confidence measure associated with a uniqueness or specificity of a minimized data cost, a confidence measure associated with whether the current pixel is included in the occlusion area, and a confidence measure associated with a texture included in the current pixel.

For example, the confidence measure extractor 410 may extract an extended left-right difference (hereinafter, briefly referred to as an LRDE) among the confidence measure associated with whether a current pixel is included in an occlusion area, in addition to the confidence measures defined as shown in Equations 8 to 10. For example, an LRDE $C_{LRDE}(x,y)$ of a current pixel may be defined as shown in Equation 12 below.

$$C_{LRDE}(x, y) = \quad \text{[Equation 12]}$$
$$\min_d \left( |c_1(d) - c_1| + \left| c^R_{(x-d,y)}(d) - \min_{d'}(c^R_{(x-d,y)}(d')) \right| \right)$$

The response extractor 420 may extract a response to the confidence measure extracted by the confidence measure extractor 410 from verified occlusion area information, for example, a ground-truth occlusion map. The response extracted by the response extractor 420 may be, for example, a response to whether a current pixel is included in an occlusion area.

For example, when the current pixel is not included in the occlusion area, the response $P^*_x$ extracted by the response extractor 420 may be "1." When the current pixel is included in the occlusion area, the response $P^*_x$ may be "0."

The confidence learner 430 may learn a relationship between the confidence measure extracted by the confidence measure extractor 410 and the response extracted by the response extractor 420.

For example, when the confidence measure vector $a_x$ is received from the confidence measure extractor 410, the confidence learner 430 may learn a function $f(a_x)$ to output the response $P^*_x$. In this example, the confidence measure vector $a_x$ output from the confidence measure extractor 410 may be, for example, a confidence measure vector extracted from a test image corresponding to verified occlusion area information.

The learned function $f(a_x)$ may receive, as an input, a confidence measure vector of an actual image for which a cost function is to be determined. Additionally, the learned function $f(a_x)$ may estimate a unary confidence of the actual image.

The function learner 440 may learn a function $h(P_x)$ to output a coefficient of stereo matching, based on the unary confidence estimated by the function $f(a_x)$ learned by the confidence learner 430.

Figure 5:
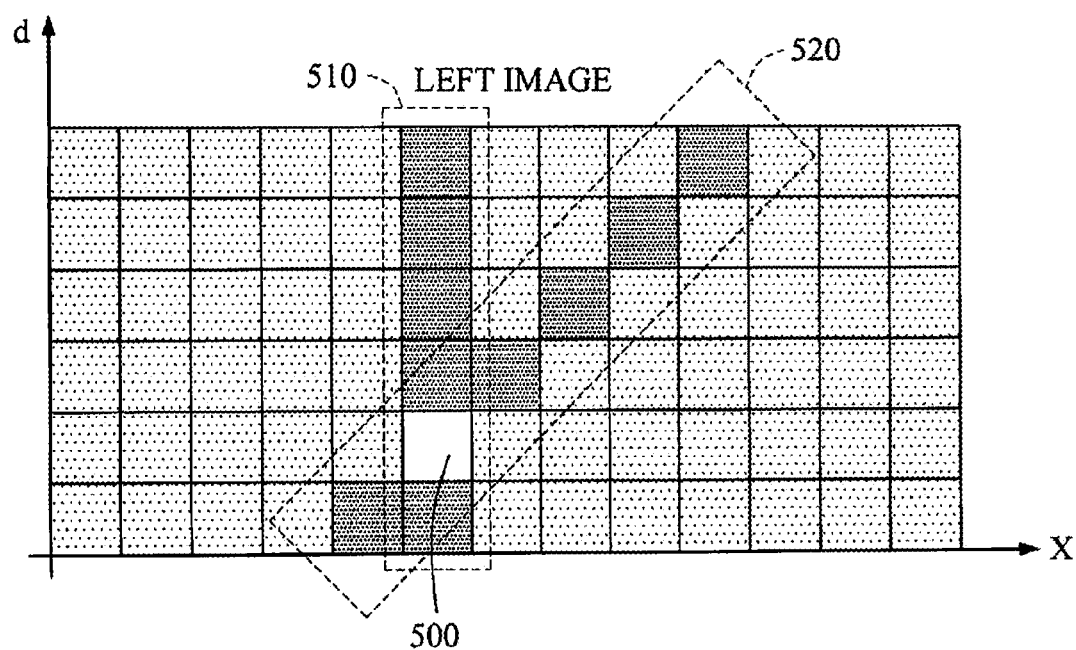
FIG. 5 illustrates an example of an operation of extracting a confidence measure according to an example embodiment.

FIG. 5 illustrates an example of an operation of extracting a confidence measure according to example embodiments.

Referring to FIG. 5, a current pixel 500 may correspond to data costs 510 of a left image and data costs 520 of a right image.

A minimized data cost among the data costs 510 and a minimized data cost among the data costs 520 need to be equal to a data cost of the current pixel 500 and accordingly, the minimized data costs may be unique and specific values.

Accordingly, the confidence measure extractor 410 of FIG. 4 may remove data costs other than the data cost of the current pixel 500 among the data costs 510 and 520 using Equation 8.

Figure 6:
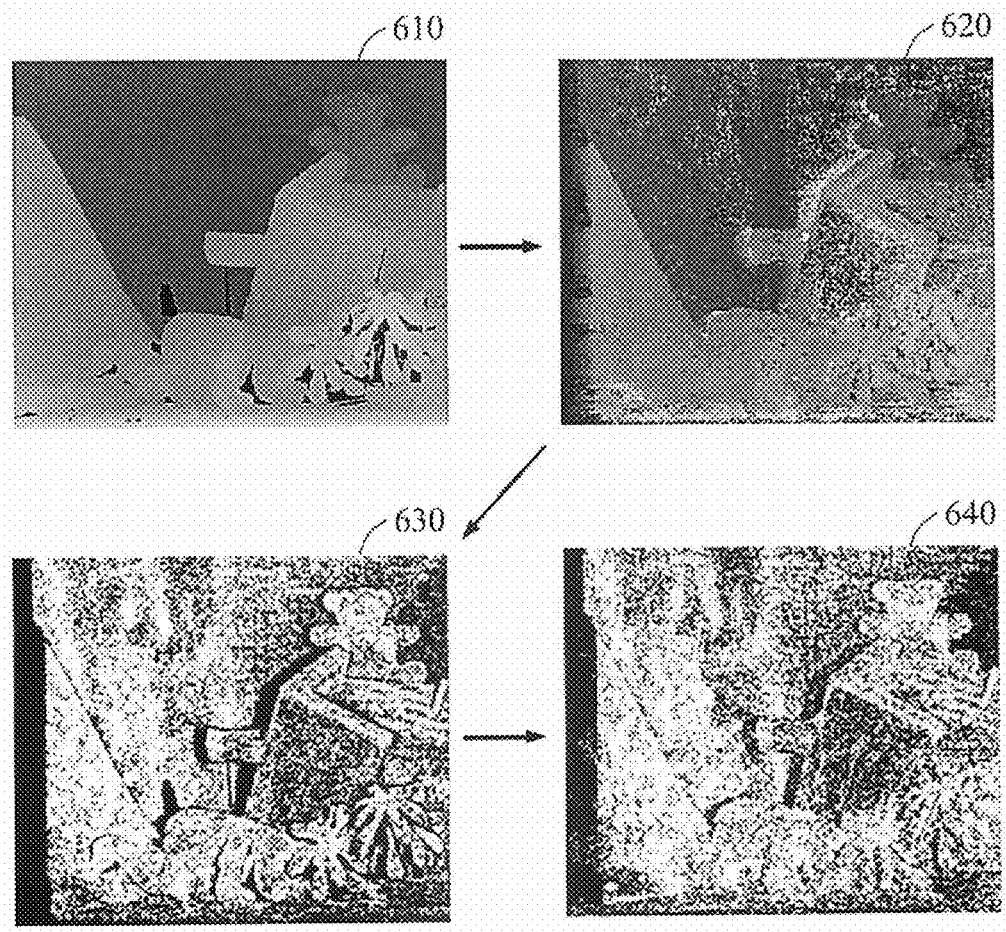
FIG. 6 illustrates an example of a result of applying a learned unary confidence according to an example embodiment.

FIG. 6 illustrates an example of a result of applying a learned unary confidence according to example embodiments.

The confidence learner 430 may compare verified binocular disparity information 610 to binocular disparity information 620 corresponding to a minimized data cost, and may check for binocular disparity information used to minimize a data cost. The confidence learner 430 may determine whether the checked binocular disparity information is accurate. Additionally, the confidence learner 430 may determine which one of pixels has accurate binocular disparity information. The binocular disparity information 620 may be, for example, binocular disparity information estimated based on a confidence measure extracted from a test image corresponding to the verified binocular disparity information 610. In a determination result 630, a pixel having accurate binocular disparity information by minimizing a data cost may be indicated by white.

The confidence learner 430 may learn a unary confidence associated with whether each of pixels included in an image is enabled to acquire binocular disparity information by minimizing a data cost, using the pixels indicated by white in the determination result 630.

The cost function determiner 140 may apply the unary confidence learned by the confidence learner 430 to an actual image for which a cost function is to be determined, and may output binocular disparity information 640.

Among pixels included in the binocular disparity information 640, a pixel having a unary confidence $P_x$ greater than "0.5" may be indicated by white, and a pixel having a unary confidence $P_x$ less than or equal to "0.5" may be indicated by black.

FIG. 7 illustrates an example of verified binocular disparity information and binocular disparity information estimated based on a learned unary confidence according to example embodiments.

In FIG. 7, the unary confidence learner 120 may estimate binocular disparity information based on a unary confidence learned by an accuracy of a binocular disparity of a current pixel.

In verified binocular disparity information 710, a pixel having accurate binocular disparity information by minimizing a data cost may be indicated by white, and a pixel failing to acquire accurate binocular disparity information by minimizing a data cost may be indicated by black.

Additionally, the unary confidence learner 120 may learn a unary confidence associated with whether each of pixels is enabled to acquire accurate binocular disparity information by minimizing a data cost, based on pixels indicated by white in the verified binocular disparity information 710.

The cost function determiner 140 may apply the unary confidence learned by the unary confidence learner 120 to an actual image for which a cost function is to be determined, and may estimate binocular disparity information 720. Among pixels included in the binocular disparity information 720, a pixel having a unary confidence $P_x$ greater than "0.5" may be indicated by white, and a pixel having a unary confidence $P_x$ less than or equal to "0.5" may be indicated by black.

Figure 8:
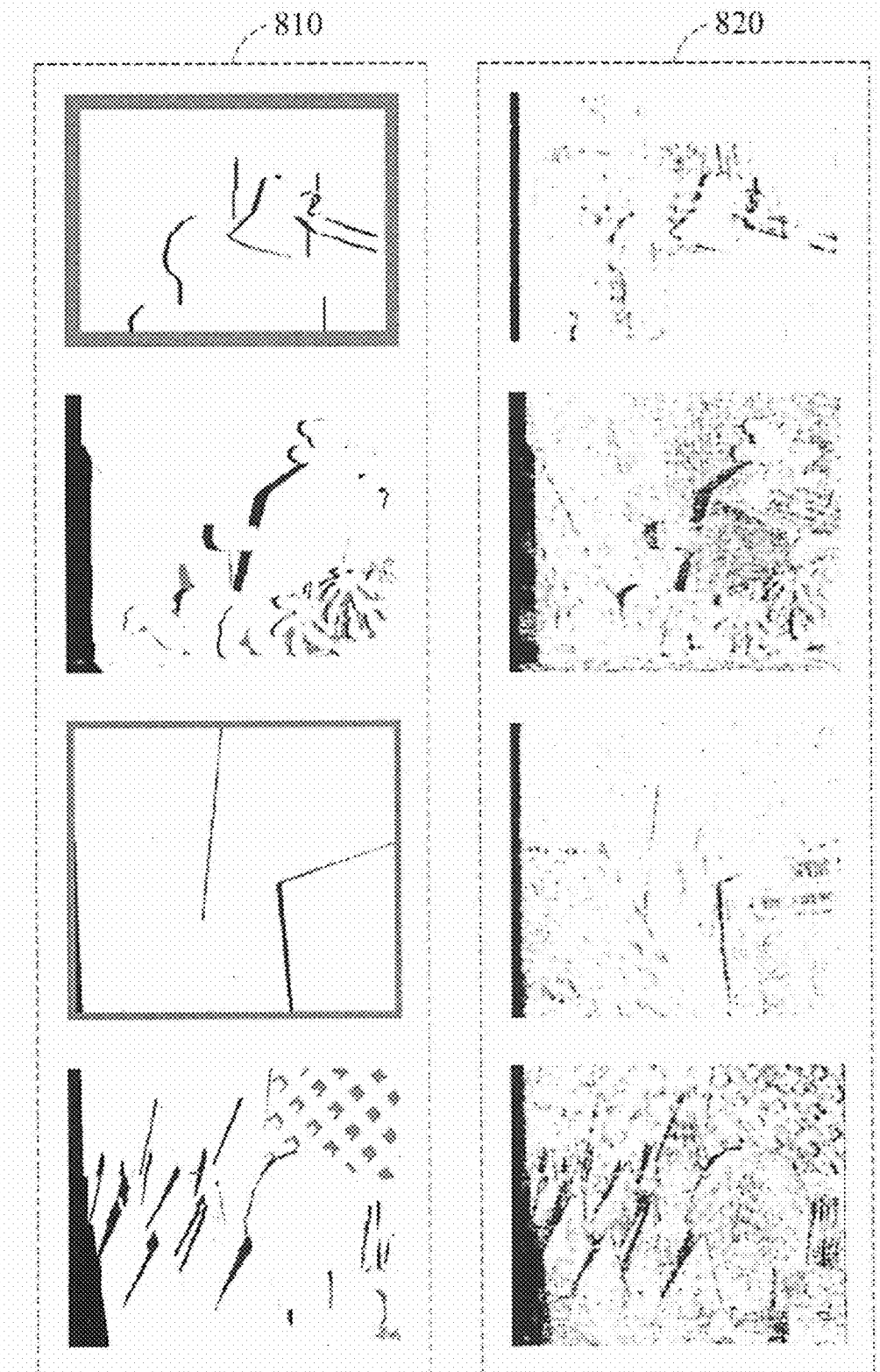
FIG. 8 illustrates an example of verified occlusion area information and occlusion area information estimated based on a learned unary confidence according to an example embodiment.

FIG. 8 illustrates an example of verified occlusion area information and occlusion area information estimated based on a learned unary confidence according to example embodiments.

In FIG. 8, the unary confidence learner 120 may estimate occlusion area information using a unary confidence learned based on whether a current pixel is included in an occlusion area.

In verified occlusion area information 810, a pixel that is not included in an occlusion area may be indicated by white, and a pixel that is included in the occlusion area may be indicated by black.

Additionally, the unary confidence learner 120 may learn a unary confidence associated with whether each of pixels is included in an occlusion area, based on pixels indicated by white in the verified occlusion area information 810.

The cost function determiner 140 may apply the unary confidence learned by the unary confidence learner 120 to an actual image for which a cost function is to be determined, and may estimate occlusion area information 820. Among pixels included in the occlusion area information 820, a pixel having a unary confidence $P_x$ greater than "0.5" may be indicated by white, and a pixel having a unary confidence $P_x$ less than or equal to "0.5" may be indicated by black.

Figure 9:
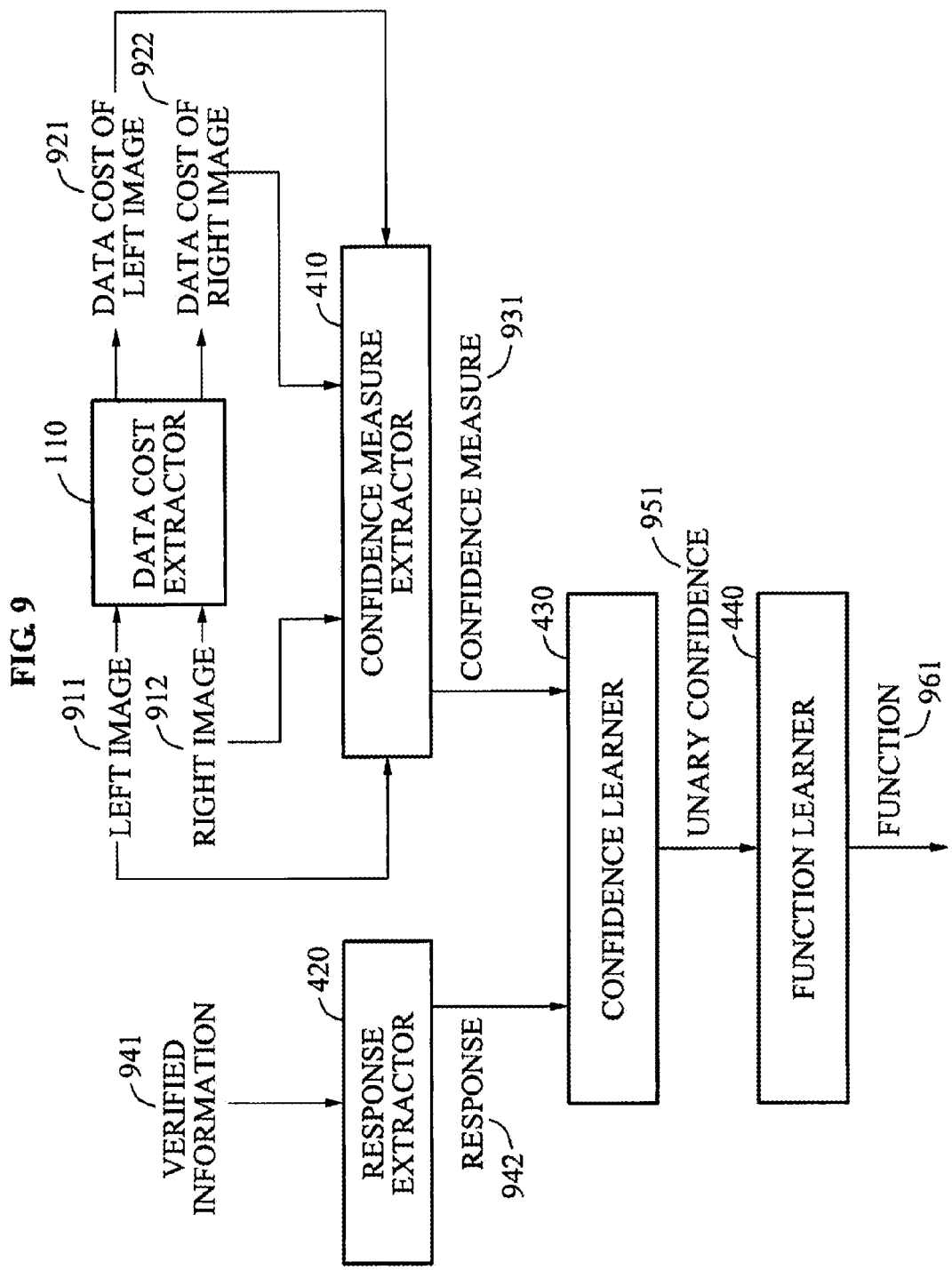
FIG. 9 illustrates an example of a process of learning a unary confidence according to an example embodiment.

FIG. 9 illustrates an example of a process of learning a unary confidence according to example embodiments.

Referring to FIG. 9, the data cost extractor 110 may extract a data cost 921 of a left image 911 from the left image 911, and may extract a data cost 922 of a right image 912 from the right image 912.

The confidence measure extractor 410 may extract a confidence measure 931 associated with a data cast from the left image 911, the right image 912, and the data costs 921 and 922.

In an example, when the unary confidence learner 120 learns a unary confidence based on an accuracy of a binocular disparity of a current pixel, the confidence measure extractor 410 may extract a confidence measure associated with the accuracy of the binocular disparity of the current pixel from the left image 911, the right image 912, and the data costs 921 and 922. In another example, when the unary confidence learner 120 learns a unary confidence based on whether a current pixel is included in an occlusion area, the confidence measure extractor 410 may extract a confidence measure associated with whether the current pixel is included in the occlusion area from the left image 911, the right image 912, and the data costs 921 and 922.

The response extractor 420 may extract a response 942 to the confidence measure 931 from verified information 941. In an example, when the unary confidence learner 120 learns a unary confidence based on an accuracy of a binocular disparity of a current pixel, the verified information 941 may be verified binocular disparity information. Additionally, the response 942 may be information regarding whether the current pixel is enabled to acquire accurate binocular disparity information by minimizing a data cost. In another example, when the unary confidence learner 120 learns a unary confidence based on whether a current pixel is included in an occlusion area, the verified information 941 may be verified occlusion area information, and the response 942 may be information regarding whether the current pixel is included in the occlusion area.

The confidence learner 430 may learn a relationship between the confidence measure 931 and the response 942, and may output a unary confidence 951.

When the confidence measure 931 is input, the confidence learner 430 may learn a function $f(a_x)$ to output the response 942. The learned function $f(a_x)$ may receive, as an input, a confidence measure vector of an actual image for which a cost function is to be determined. Additionally, the learned function $f(a_x)$ may estimate and output a unary confidence of the actual image.

The function learner 440 may learn a function h(P$_x$) 961 to output a coefficient of stereo matching based on the unary confidence estimated by the function f(a$_x$) learned by the confidence learner 430.

Figure 10:
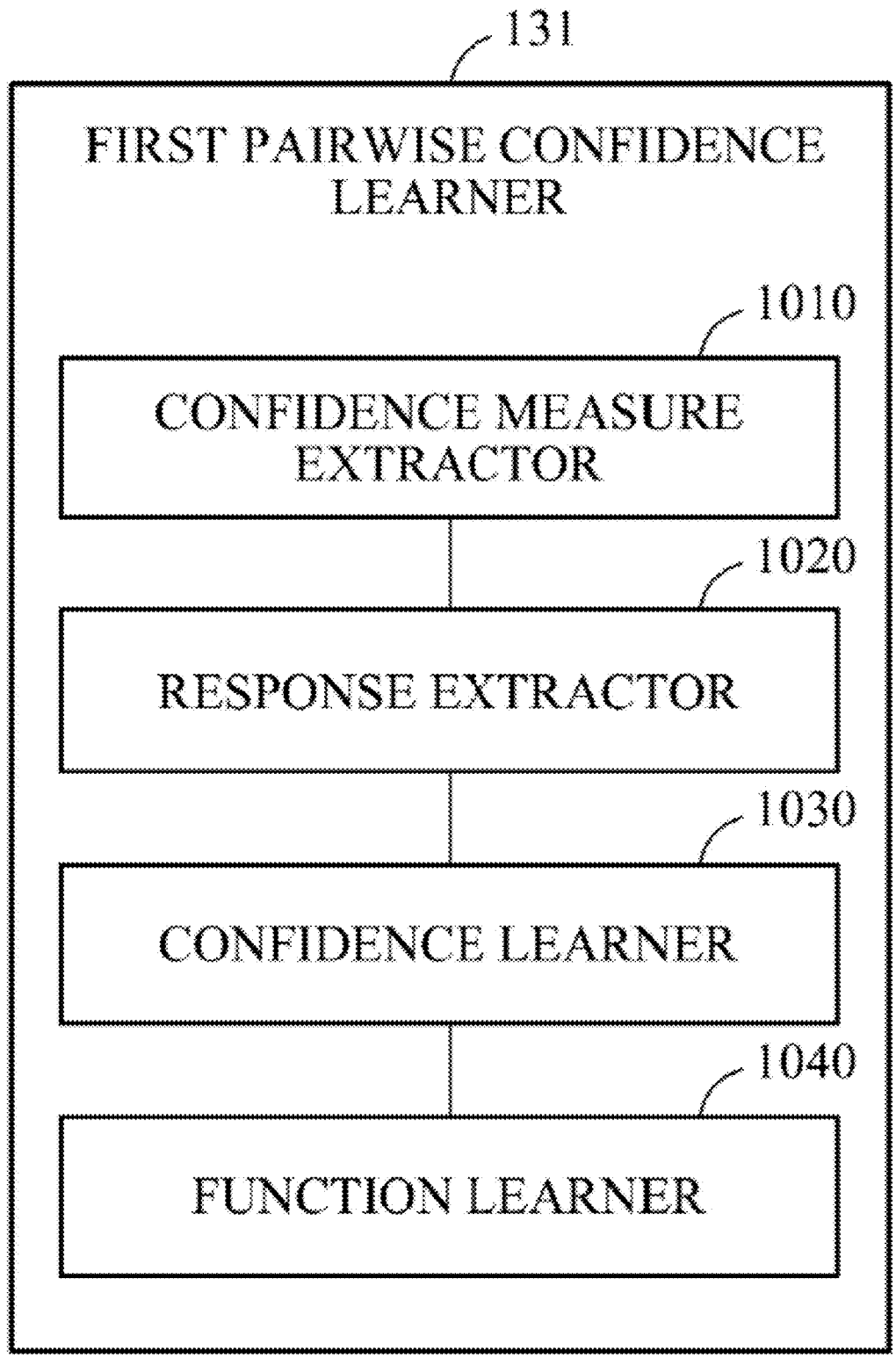
FIG. 10 illustrates a structure of a first pairwise confidence learner in the stereo matching apparatus of FIG. 1.

FIG. 10 illustrates a structure of the first pairwise confidence learner 131 in the stereo matching apparatus 100 of FIG. 1.

Referring to FIG. 10, the first pairwise confidence learner 131 may include a confidence measure extractor 1010, a response extractor 1020, a confidence learner 1030, and a function learner 1040.

The confidence measure extractor 1010 may extract a confidence measure associated with a similarity between a binocular disparity of a current pixel and a binocular disparity of a neighboring pixel from a left image, a right image, a data cost of the left image, and a data cost of the right image.

The confidence measure extractor 1010 may extract at least one of a confidence measure associated with a color similarity between the current pixel and the neighboring pixel, a confidence measure associated with a location similarity between the current pixel and the neighboring pixel, and a confidence measure associated with a binocular disparity similarity between the current pixel and the neighboring pixel.

For example, the confidence measure extractor 1010 may extract a confidence measure b$_c$ associated with a color similarity between the current pixel x and the neighboring pixel y. The confidence measure b$_c$ may be defined as shown in Equation 13 below.

$$b_c = \{\|I^L(x+\Delta x) - I^L(y+\Delta x)\| : \Delta x \in W\} \quad \text{[Equation 13]}$$

Additionally, the confidence measure extractor 1010 may extract a confidence measure b$_x$ associated with a location similarity between the current pixel x and the neighboring pixel y. The confidence measure b$_x$ may be defined as shown in Equation 14 below. In Equation 13, $\Delta x$ denotes a displacement in an area W, and the area W may have, for example, 3×3 pixels, or 5×5 pixels.

$$b_x = y - x \quad \text{[Equation 14]}$$

For example, when a data cost of a current pixel is similar to a data cost of a neighboring pixel, a binocular disparity of the current pixel may be similar to a binocular disparity of the neighboring pixel. Accordingly, the confidence measure extractor 1010 may extract a confidence measure b$_d$ associated with a binocular disparity similarity between the current pixel and the neighboring pixel, based on a similarity c$_{x,y}$(d) between the data cost of the current pixel and the data cost of the neighboring pixel. The similarity c$_{x,y}$(d) and the confidence measure b$_d$ may be defined as shown in Equation 15 below.

$$b_d = \{c_{x,y}(d) : d = \{d_1, \ldots, d_N\}\} \quad \text{[Equation 15]}$$

$$c_{x,y}(d) = \min\left(\left\{\max_{(\Delta d, \Delta d_x)}(c_x(d+\Delta d_x), c_y(d+\Delta d_y))\right\}\right)$$

In Equation 15, $\Delta d_x$ and $\Delta d_y$ denote displacements for a binocular disparity equal to or less than a threshold value, which may be predetermined and/or selected. Additionally, d$_1$ through d$_N$ denote a first binocular disparity through an N-th binocular disparity arranged in an ascending order in the similarity c$_{x,y}$(d), respectively.

When a brightness of the left image is different from a brightness of the right image, the confidence measure extractor 1010 may normalize the extracted confidence measure.

Additionally, the confidence measure extractor 1010 may output the extracted confidence measures as a single vector, that is, a confidence measure vector. For example, a confidence measure vector b$_{x,y}$ may be represented as shown in Equation 16 below.

$$b_{x,y} = \begin{bmatrix} b_c \\ b_x \\ b_d \end{bmatrix} \quad \text{[Equation 16]}$$

The response extractor 1020 may extract a response to the confidence measure extracted by the confidence measure extractor 1010 from verified discontinuity information, for example, a ground-truth discontinuity map. The verified discontinuity information may be generated by extracting discontinuous pixel pairs from among pixels included in verified binocular disparity information, for example, a ground-truth disparity map. Additionally, the response extracted by the response extractor 1020 may be, for example, a response to whether a boundary between the current pixel and the neighboring pixel exists.

For example, when the current pixel is not positioned in a boundary in an image, a response Q*$_{x,y}$ extracted by the response extractor 1020 may be "1." Additionally, when the current pixel is positioned in the boundary, the response Q*$_{x,y}$ may be "0."

The confidence learner 1030 may learn a relationship between the confidence measure extracted by the confidence measure extractor 1010 and the response extracted by the response extractor 1020.

For example, when the confidence measure vector b$_{x,y}$ is received from the confidence measure extractor 1010, the confidence learner 1030 may learn a function g(b$_{x,y}$) to output the response Q*$_{x,y}$. The confidence learner 1030 may learn the function g(b$_{x,y}$) using a supervised learning scheme. In this example, the confidence measure vector b$_{x,y}$ may be a confidence measure vector extracted from a test image corresponding to the verified discontinuity information.

The learned function g(b$_{x,y}$) may receive, as an input, a confidence measure vector of an actual image for which a cost function is to be determined. Additionally, the learned function g(b$_{x,y}$) may estimate a first pairwise confidence Q$_{x,y}$ of the actual image.

The function learner 1040 may learn a function k(Q$_{x,y}$) to output a coefficient of stereo matching based on the first pairwise confidence Q$_{x,y}$ estimated by the function g(b$_{x,y}$) learned by the confidence learner 1030. The function learner 1040 may learn the function k(Q$_{x,y}$), to minimize a binocular disparity error in the stereo matching. The function k(Q$_{x,y}$) may be, for example, a function to apply a weight to a first pairwise confidence based on an accuracy or error of the first pairwise confidence. For example, when the first pairwise confidence Q$_{x,y}$ is completely accurate, a result of the function k(Q$_{x,y}$) may be identical to the first pairwise confidence Q$_{x,y}$.

The function k(Q$_{x,y}$) may be, for example, a simple linear function, or an exponential function.

Figure 11:
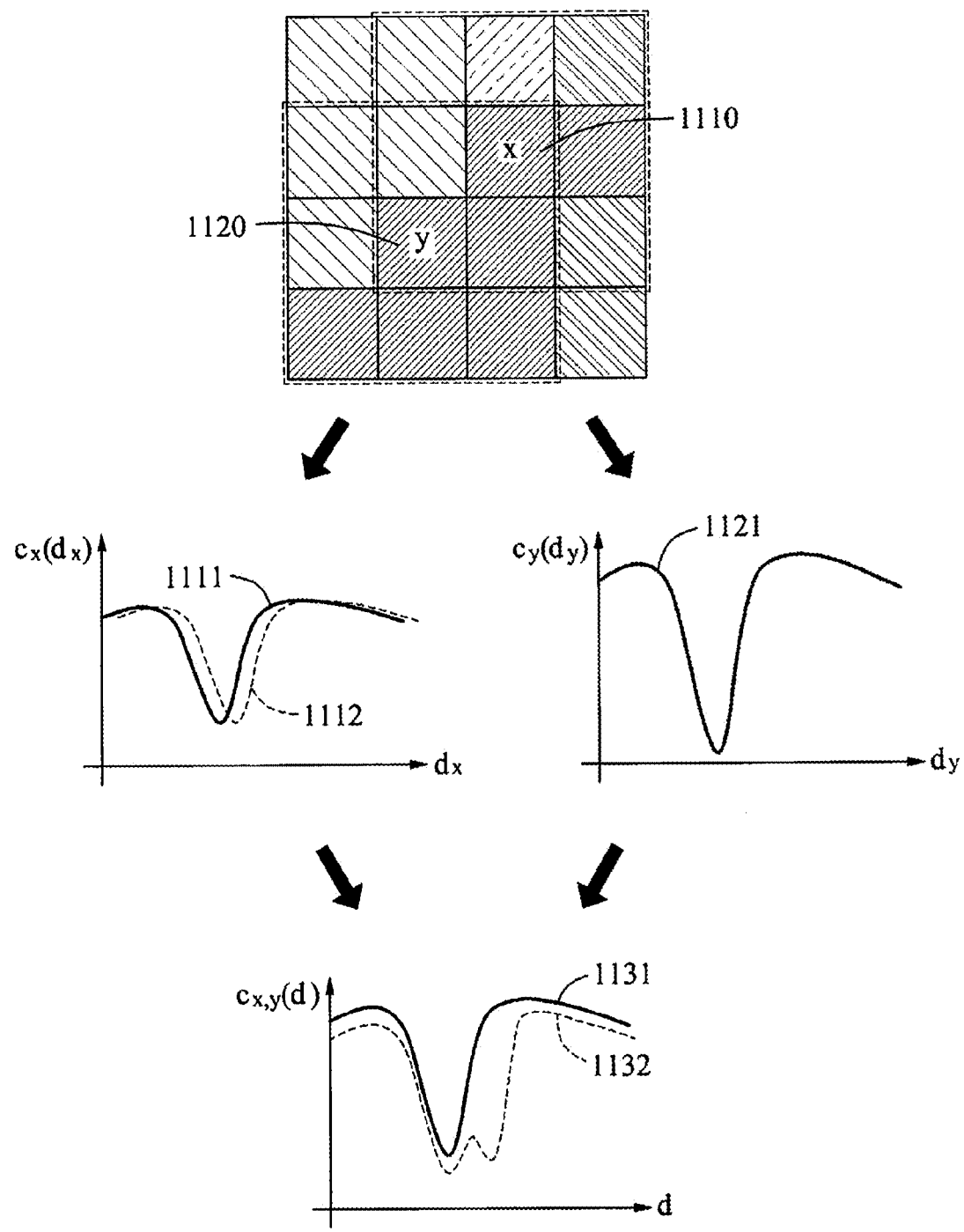
FIG. 11 illustrates an example of a process of learning a first pairwise confidence according to an example embodiment.

FIG. 11 illustrates an example of a process of learning a first pairwise confidence according to example embodiments.

The first pairwise confidence learner 131 may learn a first pairwise confidence associated with smoothing of a current pixel x 1110, based on a similarity between a binocular disparity $d_x$ of the current pixel x 1110 and a binocular disparity $d_y$ of a neighboring pixel y 1120 adjacent to the current pixel x 1110.

In an example, a value of the binocular disparity $d_x$ corresponding to a lowest value of a cost $c_x(d_x)$ 1111 of the current pixel x 1110 may be similar to a value of the binocular disparity $d_y$ corresponding to a lowest value of a cost $c_y(d_y)$ 1121 of the neighboring pixel y 1120.

In this example, a cost $c_{x,y}(d)$ 1131 generated by combining the costs $c_x(d_x)$ 1111 and $c_y(d_y)$ 1121 may have a single lowest value as shown in FIG. 11 and accordingly, the first pairwise confidence learner 131 may learn a first pairwise confidence to determine that a boundary between the current pixel x 1110 and the neighboring pixel y 1120 does not exist.

In another example, a value of the binocular disparity $d_x$ corresponding to a lowest value of a cost $c_x(d_x)$ 1112 of the current pixel x 1110 may be different from the value of the binocular disparity $d_y$ corresponding to the lowest value of the cost $c_y(d_y)$ 1121.

In this example, a cost $c_{x,y}(d)$ 1132 obtained by combining the costs $c_x(d_x)$ 1112 and $c_y(d_y)$ 1121 may have a plurality of low values as shown in FIG. 11 and accordingly, the first pairwise confidence learner 131 may determine that the current pixel x 1110 and the neighboring pixel y 1120 are included in individual objects with different depth information. Accordingly, the first pairwise confidence learner 131 may learn a first pairwise confidence to determine that a boundary between the current pixel x 1110 and the neighboring pixel y 1120 exists.

Figure 12:
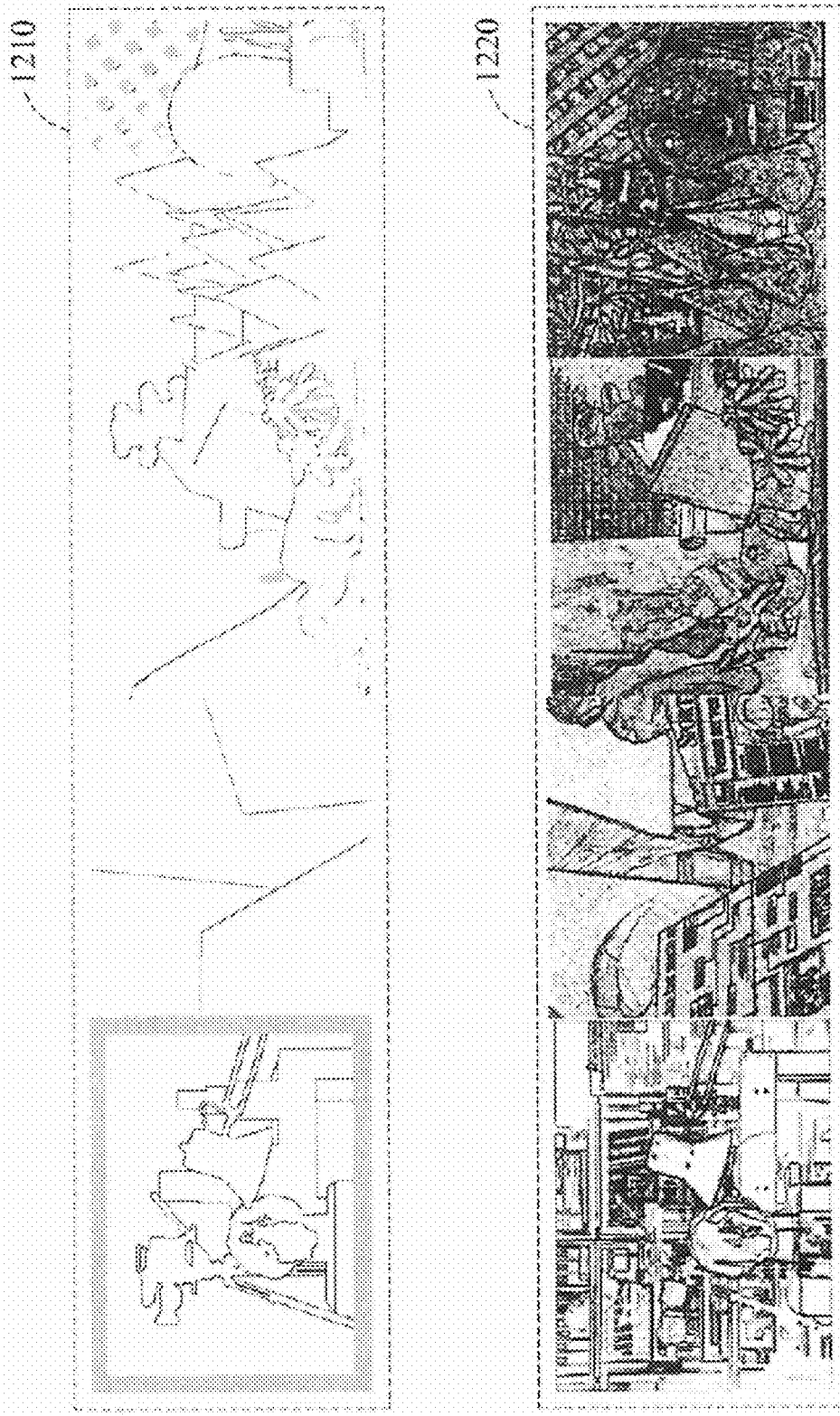
FIG. 12 illustrates an example of verified discontinuity information and discontinuity information estimated based on a learned first pairwise confidence according to an example embodiment.

FIG. 12 illustrates an example of verified discontinuity information and discontinuity information estimated based on a learned first pairwise confidence according to example embodiments.

The first pairwise confidence learner 131 may generate verified discontinuity information 1210 by extracting a discontinuous pixel pair from among pixels included in verified binocular disparity information. Additionally, the first pairwise confidence learner 131 may receive an input of verified discontinuity information representing only a boundary included in a test image as the verified discontinuity information 1210.

In an example, when a binocular disparity of a current pixel is different from a binocular disparity of a neighboring pixel positioned in a right side or a lower side of the current pixel, the current pixel may be indicated by black in the verified discontinuity information 1210. In this example, a response $Q^*_{x,y}$ extracted by the response extractor 420 may be "0."

In another example, when the binocular disparity of the current pixel is similar to the binocular disparity of the neighboring pixel, the current pixel may be indicated by white in the verified discontinuity information 1210. In this example, the response $Q^*_{x,y}$ may be "1."

In still another example, when a similarity between the binocular disparity of the current pixel and the binocular disparity of the neighboring pixel is vague, the current pixel may be indicated by gray in the verified discontinuity information 1210.

The first pairwise confidence learner 131 may learn a first pairwise confidence associated with whether each of pixels is included in a boundary based on pixels indicated by black in the verified discontinuity information 1210.

The cost function determiner 140 may apply the first pairwise confidence learned by the first pairwise confidence learner 131 to an actual image for which a cost function is to be determined, and may estimate discontinuity information 1220. Among pixels included in the discontinuity information 1220, a pixel with a first pairwise confidence $Q_{x,y}$ of "1" may be indicated by white, a pixel with a first pairwise confidence $Q_{x,y}$ of "0" may be indicated by black, and a pixel with a first pairwise confidence $Q_{x,y}$ having a value other than "0" or "1" may be indicated by gray.

Figure 13:
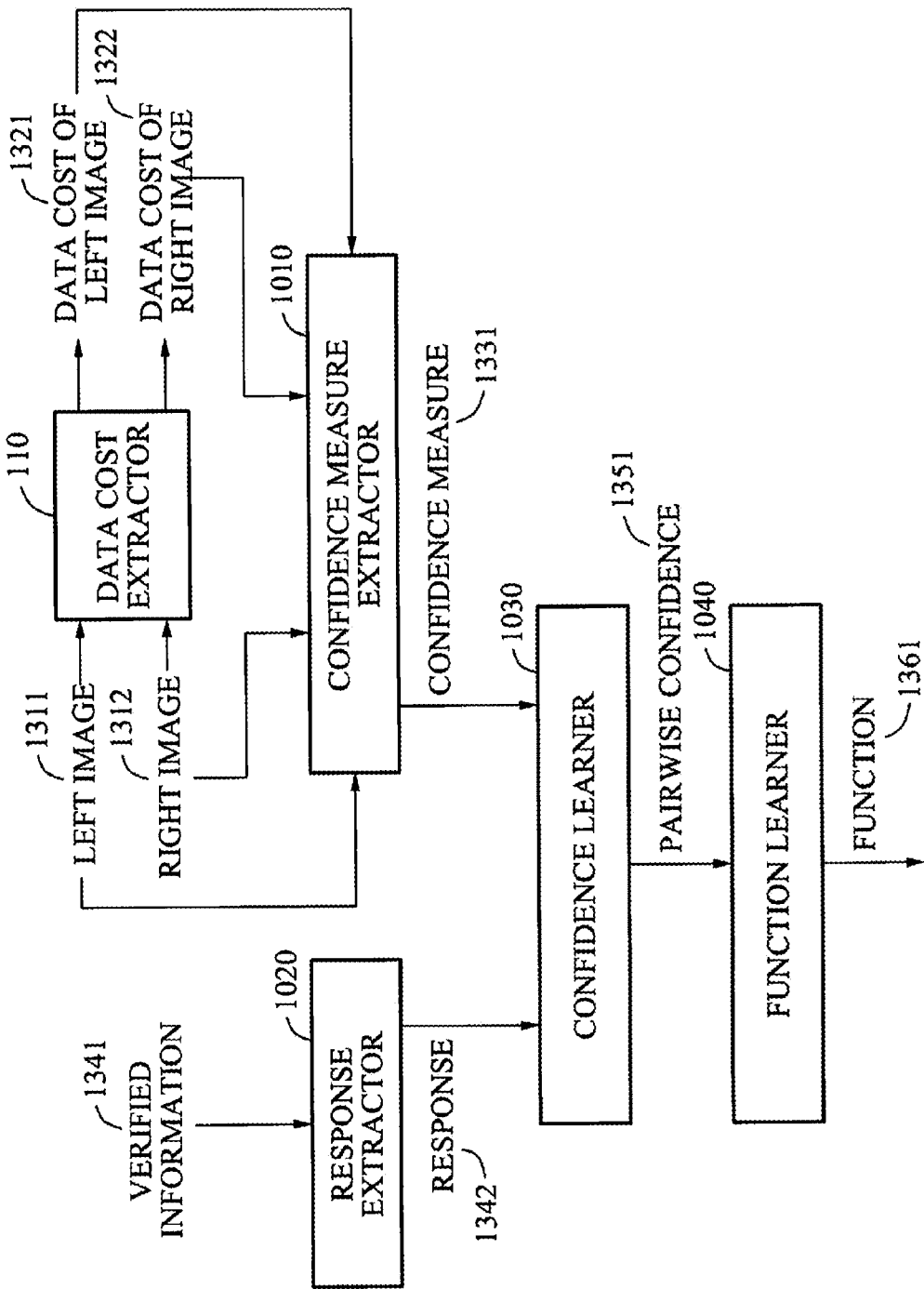
FIG. 13 illustrates an example of a process of learning a first pairwise confidence according to an example embodiment.

FIG. 13 illustrates an example of a process of learning a first pairwise confidence according to example embodiments.

Referring to FIG. 13, the data cost extractor 110 may extract a data cost 1321 of a left image 1311 from the left image 1311, and may extract a data cost 1322 of a right image 1312 from the right image 1312.

The confidence measure extractor 1010 may extract a confidence measure 1331 associated with a similarity between a binocular disparity of a current pixel and a binocular disparity of a neighboring pixel from the left image 1311, the right image 1312, and the data costs 1321 and 1322.

The response extractor 1020 may extract a response 1342 to the confidence measure 1331 from verified information 1341. The verified information 1341 may be, for example, verified discontinuity information. Additionally, the verified information 1341 may be, for example, verified binocular disparity information, and the response extractor 1020 may generate verified discontinuity information from the verified binocular disparity information. The response 1342 may be, for example, information regarding whether a current pixel is included in a boundary.

The confidence learner 1030 may learn a relationship between the confidence measure 1331 and the response 1342, and may output a first pairwise confidence 1351.

For example, when the confidence measure 1331 is received, the confidence learner 1030 may learn a function $g(b_{x,y})$ to output the response 1342. In this example, the learned function $g(b_{x,y})$ may receive, as an input, a confidence measure vector of an actual image for which a cost function is determined. Additionally, the learned function $g(b_{x,y})$ may estimate and output a first pairwise confidence $Q_{x,y}$ of the actual image.

The function learner 1040 may learn a function $k(Q_{x,y})$ 1361 to output a coefficient of stereo matching based on the first pairwise confidence $Q_{x,y}$ estimated by the function $f(a_x)$ learned by the confidence learner 1030.

Figure 14:
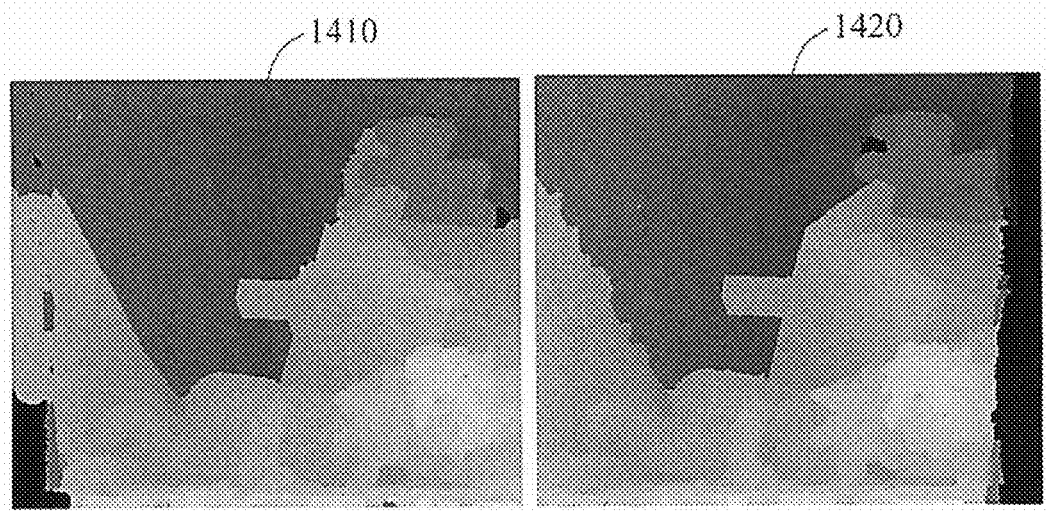
FIG. 14 illustrates an example of a result obtained using a determined cost function according to an example embodiment.

FIG. 14 illustrates an example of a result obtained using a determined cost function according to example embodiments.

The stereo matching apparatus 100 may match a left image and a right image using a cost function determined by the cost function determiner 140. Additionally, the stereo matching apparatus 100 may match the left image and the right image, and may output binocular disparity information 1410 of the left image and binocular disparity information 1420 of the right image.

An accuracy of each of the binocular disparity information 1410 and 1420 may be enhanced, in comparison to an accuracy of the binocular disparity information 330 and 340 of FIG. 3 that are output using an existing method.

Figure 15:
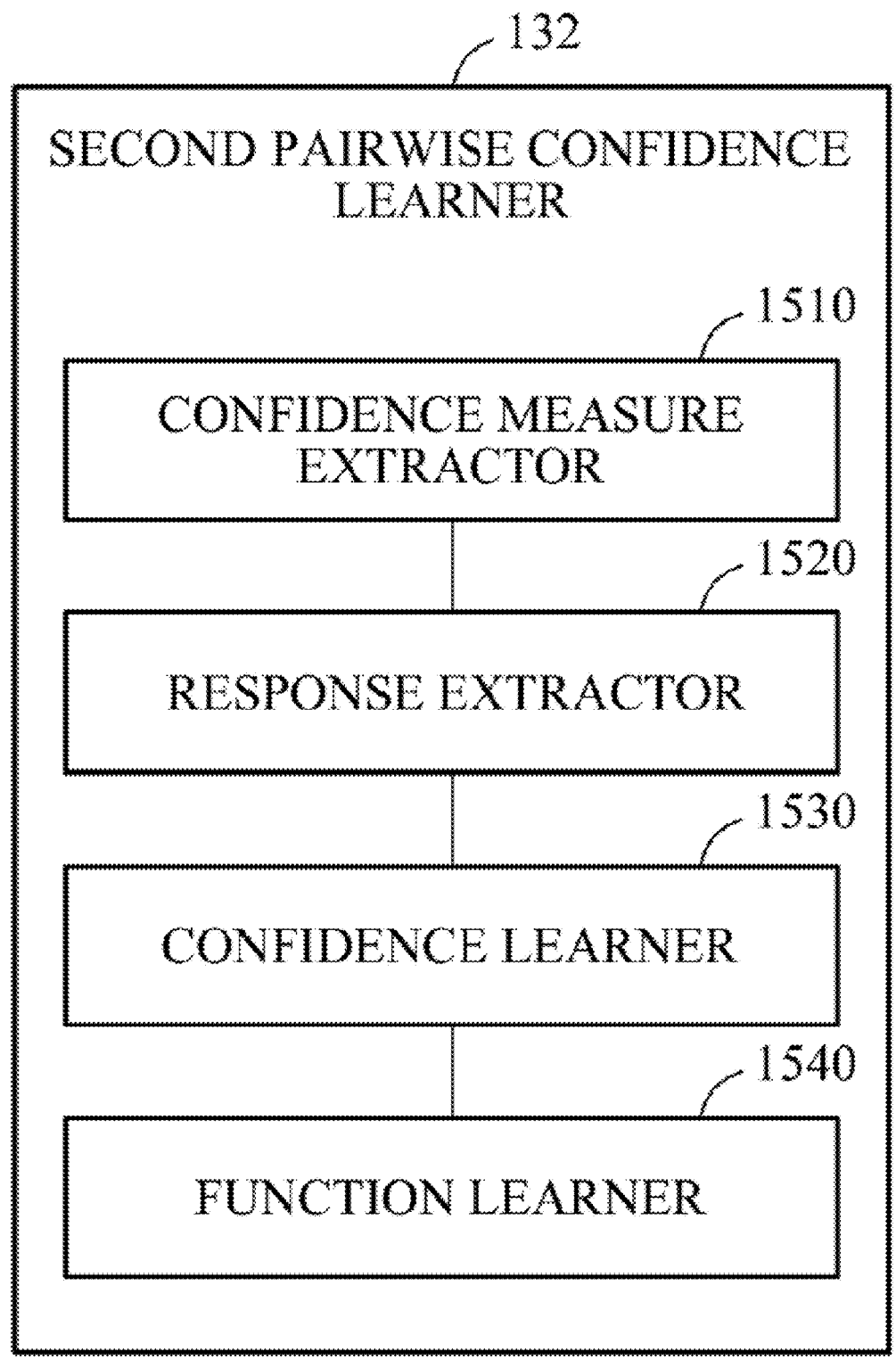
FIG. 15 illustrates a structure of a second pairwise confidence learner in the stereo matching apparatus of FIG. 1.

FIG. 15 illustrates a structure of the second pairwise confidence learner 132 in the stereo matching apparatus 100 of FIG. 1.

Referring to FIG. 15, the second pairwise confidence learner 132 may include a confidence measure extractor 1510, a response extractor 1520, a confidence learner 1530, and a function learner 1540.

When a stereo video including consecutive frames is input, the second pairwise confidence learner 132 may learn a second pairwise confidence representing a relationship between a current pixel included in a current frame and a neighboring pixel included in a previous frame.

The confidence measure extractor 1510 may extract a confidence measure associated with a similarity between a binocular disparity of the previous frame and a binocular disparity of the current frame from a left image, a right image, a data cost of the left image, and a data cost of the right image.

In an example, the confidence measure extractor 1510 may extract a confidence measure $b_c$ associated with a color similarity between the current pixel and the neighboring pixel. The confidence measure $b_c$ may be defined as shown in Equation 13.

In another example, the confidence measure extractor 1510 may extract a confidence measure $b_x$ associated with a location similarity between the current pixel and the neighboring pixel. The confidence measure $b_x$ may be defined as shown in Equation 14.

In still another example, the confidence measure extractor 1510 may extract a confidence measure $b_d$ associated with a binocular disparity similarity between the current pixel and the neighboring pixel, based on a similarity $c_{x,y}(d)$ between a data cost of the current pixel and a data cost of the neighboring pixel. The similarity $c_{x,y}(d)$ and the confidence measure $b_d$ may be defined as shown in Equation 17 below.

$$b_d = c_{x,y}(d_y^{t-1}) \qquad \text{[Equation 17]}$$

$$c_{x,y}(d_y^{t-1}) = \min\left(\left\{\max_{\Delta d_x}(c_x(d_y^{t-1} + \Delta d_x), c_y^{t-1}(\Delta d_y^{t-1}))\right\}\right)$$

In Equation 17, $d_y^{t-1}$ denotes a binocular disparity of a neighboring pixel y of a frame t−1 that corresponds to a current pixel x of a frame t.

The confidence measure extractor 1510 may output the extracted confidence measures as a single vector, that is, a confidence measure vector. For example, a confidence measure vector $b_{x,y}$ may be represented as shown in Equation 16.

The response extractor 1520 may extract, from a verified binocular disparity video, a response to the confidence measure extracted by the confidence measure extractor 1510. The response extracted by the response extractor 1520 may be, for example, a response to whether a binocular disparity of a neighboring pixel in a previous frame is similar to a binocular disparity of a current pixel in a current frame. Additionally, the neighboring pixel may correspond to the current pixel.

In an example, when a binocular disparity of a current pixel x in a frame t is similar to a binocular disparity of a neighboring pixel y in a frame t−1, a response $R^*_{x,y}$ extracted by the response extractor 1520 may be "1." In another example, when the binocular disparity of the current pixel x is different from the binocular disparity of the neighboring pixel y, the response $R^*_{x,y}$ may be "0."

The confidence learner 1530 may compare the confidence measure extracted by the confidence measure extractor 1510 to the response extracted by the response extractor 1520, and may learn a second pairwise confidence.

For example, when the confidence measure vector $b_{x,y}$ is received from the confidence measure extractor 1510, the confidence learner 1530 may learn a function $g(b_{x,y})$ to output the response $R^*_{x,y}$. The confidence learner 1030 may use a supervised learning scheme to learn the function $g(b_{x,y})$. The confidence measure vector $b_{x,y}$ may be, for example, a confidence measure vector extracted from a test image corresponding to verified discontinuity information.

The learned function $g(b_{x,y})$ may receive, as an input, a confidence measure vector of an actual image for which a cost function is to be determined. Additionally, the learned function $g(b_{x,y})$ may estimate a second pairwise confidence $R_{x,y}$ of the actual image.

The function learner 1540 may learn a function $k'(R_{x,y})$ to output a coefficient of stereo matching based on the second pairwise confidence $R_{x,y}$ estimated by the function $g(b_{x,y})$ learned by the confidence learner 1530. The function learner 1040 may learn the function $k'(R_{x,y})$, to minimize a binocular disparity error in the stereo matching. The function $k'(R_{x,y})$ may be, for example, a function to apply a weight to a second pairwise confidence based on an accuracy or error of the second pairwise confidence. For example, when the second pairwise confidence $R_{x,y}$ is completely accurate, a result of the function $k'(R_{x,y})$ may be identical to the second pairwise confidence $R_{x,y}$.

The function $k'(R_{x,y})$ may be, for example, a simple linear function, or an exponential function.

Figure 16:
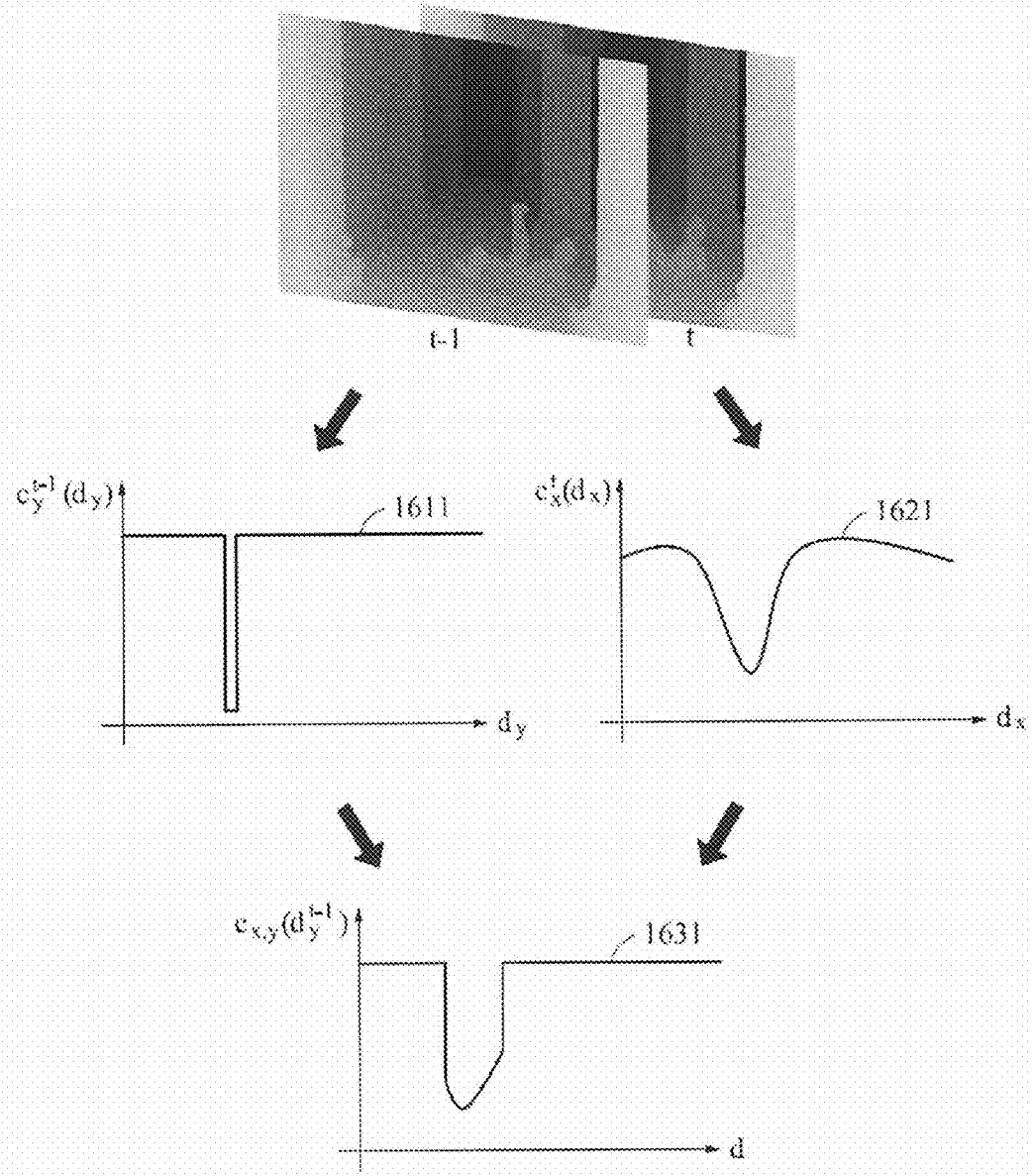
FIG. 16 illustrates an example of a process of learning a second pairwise confidence according to an example embodiment.

FIG. 16 illustrates an example of a process of learning a second pairwise confidence according to example embodiments.

The second pairwise confidence learner 130 may learn a second pairwise confidence of a current pixel x in a frame t, according to a change in time, based on a similarity between a binocular disparity $d_x$ of the current pixel x and a binocular disparity $d_y$ of a neighboring pixel y in a frame t−1.

For example, the second pairwise confidence learner 130 may search for a value of the binocular disparity $d_y$ corresponding to a lowest value of a cost $c_y^{t-1}(d_y)$ 1611 of the neighboring pixel y.

Additionally, the second pairwise confidence learner 130 may search for a value of the binocular disparity $d_x$ corresponding to a lowest value of a cost $c_x^t(d_x)$ 1621 of the current pixel x.

The second pairwise confidence learner 130 may generate a cost $c_{x,y}(d_y^{t-1})$ 1631 by combining the costs $c_y^{t-1}(d_y)$ 1611 and $c_x^t(d_x)$ 1621. A value of a binocular disparity corresponding to a lowest value of the cost $c_{x,y}(d_y^{t-1})$ 1631 may be determined based on the value of the binocular disparity $d_y$ corresponding to the lowest value of the cost $c_y^{t-1}(d_y)$ 1611, and the value of the binocular disparity $d_x$ corresponding to the lowest value of the cost $c_x^t(d_x)$ 1621.

For example, when the value of the binocular disparity $d_y$ corresponding to the lowest value of the cost $c_y^{t-1}(d_y)$ 1611 is similar to the value of the binocular disparity $d_x$ corresponding to the lowest value of the cost $c_x^t(d_x)$ 1621, the cost $c_{x,y}(d_y^{t-1})$ 1631 may have a single lowest value as shown in FIG. 16. In this example, the second pairwise confidence learner 132 may determine that the binocular disparity $d_x$ of the current pixel x is similar to the binocular disparity $d_y$ of the neighboring pixel y.

Figure 17:
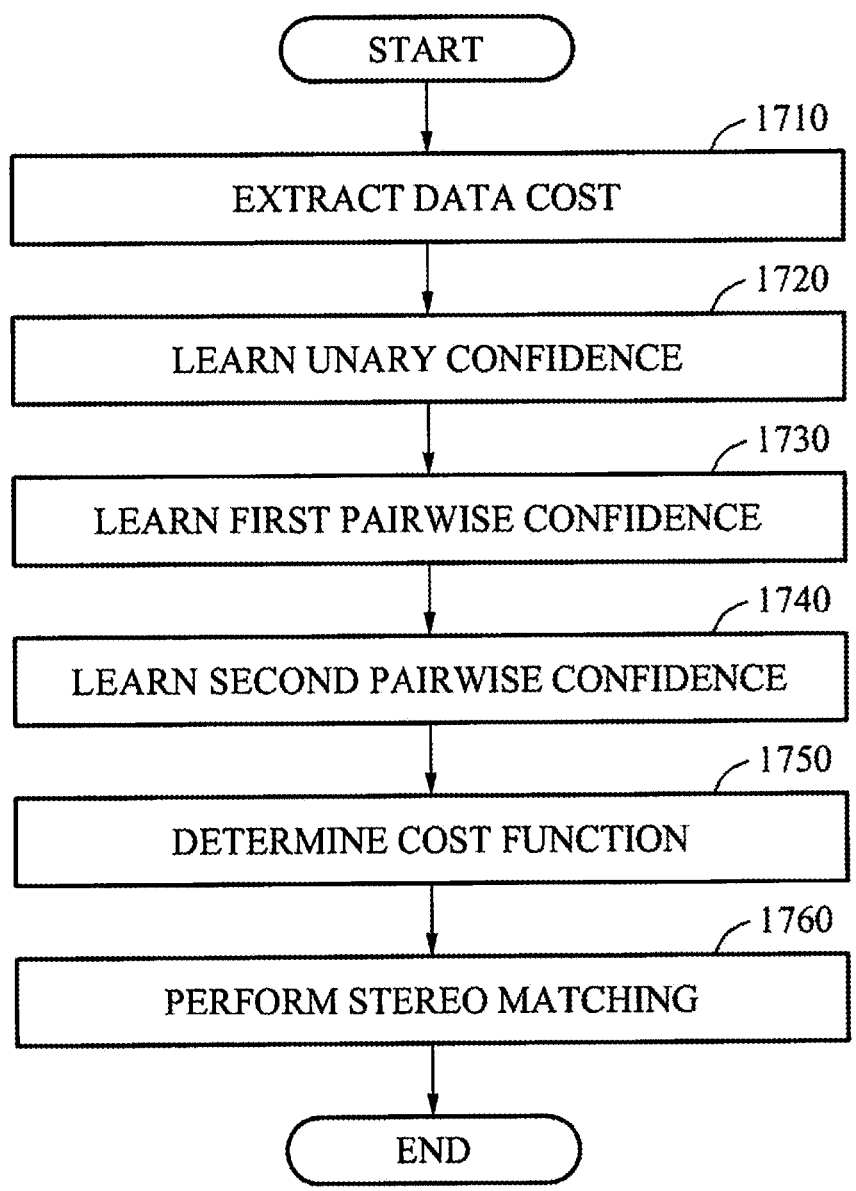
FIG. 17 illustrates a stereo matching method according to an example embodiment.

FIG. 17 illustrates a stereo matching method according to example embodiments.

Referring to FIG. 17, in operation 1710, the data cost extractor 110 may extract a data cost of a left image and a data cost of a right image from the left image and the right image, respectively.

In operation 1720, the unary confidence learner 120 may learn a unary confidence associated with a data cost of a current pixel, based on a binocular disparity between the left image and the right image. For example, the unary confidence may be determined based on an accuracy of a binocular disparity of the current pixel, or whether the current pixel is included in an occlusion area.

Additionally, the unary confidence learner 120 may extract a confidence measure from the left image, the right image, and the data costs extracted in operation 1710, and may learn the unary confidence. The confidence measure may be associated with the accuracy of the binocular disparity of the current pixel, or whether the current pixel is included in the occlusion area.

In operation 1730, the first pairwise confidence learner 131 may learn a first pairwise confidence associated with smoothing of the current pixel, based on a similarity between the current pixel and a neighboring pixel adjacent to the current pixel. For example, the first pairwise confidence may be determined based on whether a boundary between the current pixel and the neighboring pixel exists.

Additionally, the first pairwise confidence learner 131 may extract a confidence measure associated with the similarity between the current pixel and the neighboring pixel, from the left image, the right image, and the data costs extracted in operation 1710, and may learn the first pairwise confidence.

In operation 1740, the second pairwise confidence learner 132 may learn a second pairwise confidence, for example a temporal confidence, of a current pixel included in a current frame, based on a similarity between a binocular disparity of the current frame and a binocular disparity of a previous frame temporally adjacent to the current frame. The second pairwise confidence may be determined based on whether the current pixel is similar to a pixel that is included in the previous frame and that corresponds to the current pixel. Operation 1740 may be performed when a stereo video including a plurality of consecutive frames is input.

In operation 1750, the cost function determiner 140 may determine a cost function of stereo matching, based on at least one of a discontinuity cost, the data costs extracted in operation 1710, the unary confidence learned in operation 1720, the first pairwise confidence learned in operation 1730, and the second pairwise confidence learned in operation 1740.

In operation 1760, the stereo matcher 150 may perform stereo matching between the left image and the right image at a minimum cost, using the cost function determined in operation 1750, and may output binocular disparity information of each of the left image and the right image.

FIG. 18 illustrates operation 1720 of FIG. 17. Operations 1810 through 1840 of FIG. 18 may be included in operation 1720.

In operation 1810, the confidence measure extractor 410 may extract a confidence measure associated with an accuracy of a binocular disparity of a current pixel from the left image, the right image, and the data costs extracted in operation 1710. Also, the confidence measure extractor 410 may extract a confidence measure associated with whether the current pixel is included in the occlusion area from the left image, the right image, and the data costs extracted in operation 1710.

In operation 1820, the response extractor 420 may extract, from verified binocular disparity information, a response to the confidence measure extracted in operation 1810. For example, in operation 1820, the response extractor 420 may extract a response to whether an accurate binocular disparity is enabled to be determined by minimizing a data cost in the current pixel, or a response to whether the current pixel is included in the occlusion area.

In operation 1830, the confidence learner 430 may learn a relationship between the confidence measure extracted in operation 1810 and the response extracted in operation 1820. For example, when the confidence measure extracted in operation 1810 is input, the confidence learner 430 may learn a function $f(a_x)$ to output the response extracted in operation 1820. In this example, the learned function $f(a_x)$ may receive, as an input, a confidence measure vector of an actual image for which a cost function is to be determined. Additionally, the learned function $f(a_x)$ may estimate and output a unary confidence of the actual image.

In operation 1840, the function learner 440 may learn a function $h(P_x)$ to output a coefficient of stereo matching based on a unary confidence $P_x$ estimated by the function $f(a_x)$ learned in operation 1830. The function learner 1040 may learn the function $h(P_x)$, to minimize a binocular disparity error in the stereo matching.

FIG. 19 illustrates operation 1730 of FIG. 17. Operations 1910 through 1940 of FIG. 19 may be included in operation 1730.

Referring to FIG. 19, in operation 1910, the confidence measure extractor 1010 may extract a confidence measure associated with a similarity between a binocular disparity of a current pixel and a binocular disparity of a neighboring pixel from the left image, the right image, and the data costs extracted in operation 1710.

In operation 1920, the response extractor 1020 may extract, from verified discontinuity information, a response to the confidence measure extracted in operation 1910. The verified discontinuity information may be generated by extracting discontinuous pixel pairs from among pixels included in verified binocular disparity information. For example, in operation 1920, the response extractor 1020 may extract a response to whether a boundary between the current pixel and the neighboring pixel exists.

In operation 1930, the confidence learner 1030 may learn a relationship between the confidence measure extracted in operation 1910 and the response extracted in operation 1920, and may output a first pairwise confidence. For example, when the confidence measure vector extracted in operation 1910 is received, the confidence learner 1030 may learn a function $g(b_{x,y})$ to output the response extracted in operation 1920. In this example, the learned function $g(b_{x,y})$ may receive, as an input, a confidence measure vector of an actual image for which a cost function is to be determined. Additionally, the learned function $g(b_{x,y})$ may estimate and output a first pairwise confidence $Q_{x,y}$ of the actual image.

In operation 1940, the function learner 1040 may learn a function $k(Q_{x,y})$ to output a coefficient of stereo matching based on the first pairwise confidence $Q_{x,y}$ estimated by the function $g(b_{x,y})$ learned in operation 1930. The function learner 1040 may learn the function $k(Q_{x,y})$, to minimize a binocular disparity error in the stereo matching.

FIG. 20 illustrates operation 1740 of FIG. 17. Operations 2010 through 2040 of FIG. 20 may be included in operation 1740.

Referring to FIG. 20, in operation 2010, the confidence measure extractor 1510 may extract a confidence measure associated with a similarity between a binocular disparity of a previous frame and a binocular disparity of a current frame from the left image, the right image, and the data costs extracted in operation 1710.

In operation 2020, the response extractor 1520 may extract, from a verified binocular disparity video, a response to the confidence measure extracted in operation 2010. For example, in operation 2020, the response extractor 1520 may extract a response to whether a binocular disparity of a neighboring pixel in a previous frame is similar to a binocular disparity of a current pixel in a current frame.

In operation 2030, the confidence learner 1530 may learn a relationship between the confidence measure extracted in operation 2010 and the response extracted in operation 2020, and may output a second pairwise confidence. For example, when the confidence measure extracted in operation 2010 is received, the confidence learner 1530 may learn a function $g(b_{x,y})$ to output the response extracted in operation 2020.

The learned function $g(b_{x,y})$ may receive, as an input, a confidence measure vector of an actual image for which a cost function is to be determined. Additionally, the learned function $g(b_{x,y})$ may estimate and output a second pairwise confidence $R_{x,y}$ of the actual image.

In operation 2040, the function learner 1540 may learn a function $k'(R_{x,y})$ to output a coefficient of stereo matching based on the second pairwise confidence $R_{x,y}$ estimated by the function $g(b_{x,y})$ learned in operation 2030. The function learner 1040 may learn the function $k'(R_{x,y})$, to minimize a binocular disparity error in the stereo matching.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A stereo matching method, comprising:
    determining a pairwise confidence representing a relationship between a current pixel and a neighboring pixel in a left image and a right image using a first confidence measure;
    determining a cost function of stereo matching based on a data cost of a left image, a data cost of a right image, a similarity between a binocular disparity of the current pixel and a binocular disparity of the neighboring pixel and the pairwise confidence; and
    performing the stereo matching between the left image and the right image using the cost function,
    wherein the first confidence measure is associated with the similarity between the binocular disparity of the current pixel and the binocular disparity of the neighboring pixel, extracted according to a similarity between a data cost of the current pixel and a data cost of the neighboring pixels.

2. The stereo matching method of claim 1, wherein the determining the pairwise confidence comprises:
    determining a first pairwise confidence representing a relationship between the current pixel and the neighboring pixel in a current frame; and
    determining a second pairwise confidence representing a relationship between the current pixel in the current frame and the neighboring pixel in a previous frame.

3. The stereo matching method of claim 2, wherein the determining the first pairwise confidence comprises:
    extracting the first confidence measure from the data cost of the current pixel and the data cost of neighboring pixel;
    extracting a response to the first confidence measure from discontinuity information, the discontinuity information being based on the left image and the right image; and
    determining a relationship between the extracted confidence measure and the extracted response.

4. The stereo matching method of claim 3, wherein the first confidence measure is associated with at least one of a color similarity between the current pixel and the neighboring pixel and a location similarity between the current pixel and the neighboring pixel.

5. The stereo matching method of claim 2, wherein the determining the second pairwise confidence comprises:
    extracting a second confidence measure associated with a similarity between a binocular disparity of the previous frame and a binocular disparity of the current frame, from the data cost of the left image, and the data cost of the right image;
    extracting a response to the second confidence measure from a binocular disparity video; and
    determining a relationship between the second confidence measure and the extracted response.

6. The stereo matching method of claim 1, further comprising:
    determining a unary confidence associated with a data cost of the current pixel,
    wherein the determining the cost function determines the cost function based on the unary confidence and the pairwise confidence.

7. The stereo matching method of claim 6, wherein the determining the unary confidence comprises:
    extracting a third confidence measure associated with whether the current pixel is included in an occlusion area, from the data cost of the left image, and the data cost of the right image;
    extracting a response to the third confidence measure from occlusion area information, the occlusion area being based on the left image and the right image; and
    determining a relationship between the third confidence measure and the extracted response.

8. The stereo matching method of claim 7, wherein the third confidence measure is associated with at least one of a uniqueness of a minimized data cost, a specificity of the minimized data cost, whether the current pixel is included in the occlusion area, and a texture included in the current pixel.

9. The stereo matching method of claim 6, wherein the determining the unary confidence comprises:

extracting a fourth confidence measure associated with an accuracy of the binocular disparity of the current, from the data cost of the left image, and the data cost of the right image;

extracting a response to the fourth confidence measure from binocular disparity information, the binocular disparity information being based on the left image and the right image; and determining a relationship between the fourth confidence measure and the extracted response.

10. The stereo matching method of claim 9, wherein the fourth confidence measure is associated with at least one of whether a minimized data cost of the left image is identical to a minimized data cost of the right image, whether the current pixel is included in the occlusion area, and a texture included in the current pixel.

11. A stereo matching method, comprising:

determining a unary confidence representing whether a current pixel is included in an occlusion area;

determining a pairwise confidence representing a relationship between the current pixel and a neighboring pixel using a first confidence measure;

determining a cost function of stereo matching based on the unary confidence and the pairwise confidence; and performing the stereo matching between a left image and a right image at a cost using the cost function, wherein the first confidence measure is associated with a similarity between a binocular disparity of the current pixel and a binocular disparity of the neighboring pixel, extracted according to a similarity between a data cost of the current pixel and a data cost of the neighboring pixels.

12. The stereo matching method of claim 11, wherein the determining the unary confidence comprises:

extracting a third confidence measure associated with whether the current pixel is included in the occlusion area, from a data cost of the left image, and a data cost of the right image;

extracting a response to the third confidence measure from occlusion area information, the occlusion area information being based on the left image and the right image; and determining a relationship between the third confidence measure and the extracted response.

13. A stereo matching apparatus, comprising:

at least one processor configured to execute computer readable instructions to, determine a pairwise confidence representing a relationship between a current pixel and a neighboring pixel in a left image and a right image using a first confidence measure;

determine a cost function of stereo matching based on a data cost of a left image, a data cost of a right image, a similarity between a binocular disparity of the current pixel and a binocular disparity of the neighboring pixel and the pairwise confidence; and perform stereo matching between the left image and the right image at a cost using the cost function, wherein the first confidence measure is associated with the similarity between the binocular disparity of the current pixel and the binocular disparity of the neighboring pixel, extracted according to a similarity between a data cost of the current pixel and a data cost of the neighboring pixels.

14. The stereo matching apparatus of claim 13, wherein the at least one processor is configured to execute the computer readable instructions to, determine a first pairwise confidence representing a relationship between the current pixel and the neighboring pixel that are included in a current frame; or determine a second pairwise confidence representing a relationship between the current pixel in the current frame and the neighboring pixel in a previous frame.

15. The stereo matching apparatus of claim 14, wherein the at least one processor is configured to execute the computer readable instructions to, extract the first confidence measure from the data cost of the current pixel and the data cost of neighboring pixel;

extract a response to the first confidence measure from discontinuity information, the discontinuity information being based on the left image and the right image; and determine a relationship between the extracted confidence measure and the extracted response.

16. The stereo matching apparatus of claim 15, wherein the at least one processor is configured to execute the computer readable instructions to extract the first confidence measure is associated with at least one of a color similarity between the current pixel and the neighboring pixel and a location similarity between the current pixel and the neighboring pixel.

17. The stereo matching apparatus of claim 14, wherein the at least one processor is configured to execute the computer readable instructions to, extract a second confidence measure associated with a similarity between the binocular disparity of the previous frame and the binocular disparity of the current frame, from the data cost of the left image and the data cost of the right image;

extract a response to the second confidence measure from a binocular disparity video; and determine a relationship between the second confidence measure and the extracted response.

* * * * *